US010067404B2

United States Patent
Fujita et al.

(10) Patent No.: US 10,067,404 B2
(45) Date of Patent: Sep. 4, 2018

(54) DEVICE FOR CONTROLLING RESONATOR LIGHT PATH LENGTH

(71) Applicant: Sony Corporation, Tokyo (JP)

(72) Inventors: Goro Fujita, Kanagawa (JP); Kenji Tanaka, Tokyo (JP); Kunihiko Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 70 days.

(21) Appl. No.: 15/105,478

(22) PCT Filed: Nov. 11, 2014

(86) PCT No.: PCT/JP2014/079817
§ 371 (c)(1),
(2) Date: Jun. 16, 2016

(87) PCT Pub. No.: WO2015/098321
PCT Pub. Date: Jul. 2, 2015

(65) Prior Publication Data
US 2016/0377955 A1 Dec. 29, 2016

(30) Foreign Application Priority Data

Dec. 24, 2013 (JP) ................................. 2013-265366

(51) Int. Cl.
*G02F 1/35* (2006.01)
*G02B 26/00* (2006.01)
*H01S 3/00* (2006.01)

(52) U.S. Cl.
CPC ............. *G02F 1/353* (2013.01); *G02B 26/00* (2013.01); *G02F 1/3501* (2013.01);
(Continued)

(58) Field of Classification Search
CPC ..... G02B 26/00; G02F 1/353; G02F 2203/15; H01S 3/0092; H01S 3/0816
(Continued)

(56) References Cited

U.S. PATENT DOCUMENTS 5,339,324 A 8/1994 Eguchi et al.
9,564,732 B2* 2/2017 Urakawa .................. H05G 2/00

FOREIGN PATENT DOCUMENTS

JP 06-053593 A 2/1994
JP 08-204275 A 8/1996

OTHER PUBLICATIONS

Black, An Introduction to Pound-Drever_Hall laser frequency stabilization, Am. J. Phys., vol. 69, No. 1, Jan. 2001, pp. 79-87.
(Continued)

*Primary Examiner* — Que T Le
(74) *Attorney, Agent, or Firm* — Wolf, Greenfield & Sacks, P.C.

(57) ABSTRACT

Embodiments of a novel control device and associated techniques for controlling a light path length of a resonator to allow resonance in a mode of higher strength are described herein. The control device includes: a drive section that moves at least one reflecting unit in the resonator; and a control section that controls a light path length of the resonator, by causing the drive section to move the at least one reflecting unit so that the laser light that enters into the resonator changes from a state in which the laser light resonates in a first mode of the plurality of modes to a state in which the laser light resonates in a second mode different from the first mode, on the basis of a detection result of a reflected light from the resonator.

12 Claims, 11 Drawing Sheets

(52) U.S. Cl.
CPC .... *H01S 3/0092* (2013.01); *G02F 2001/3503* (2013.01); *G02F 2203/15* (2013.01)

(58) Field of Classification Search
USPC .................................. 250/205, 214 R, 216
See application file for complete search history.

(56) References Cited

OTHER PUBLICATIONS

Hansch et al., Laser Frequency Stabilization by Polarization Spectroscopy of a Reflecting Reference Cavity, Optics Communications, vol. 35, No. 3, Dec. 1980, pp. 441-444.

* cited by examiner

DEVICE FOR CONTROLLING RESONATOR LIGHT PATH LENGTH

CROSS-REFERENCE TO RELATED APPLICATIONS

This application is a National Stage of International Application No. PCT/JP2014/079817, filed in the Japanese Patent Office as a Receiving office on Nov. 11, 2014, which claims priority to Japanese Patent Application Number 2013-265366, filed in the Japanese Patent Office on Dec. 24, 2013, each of which is hereby incorporated by reference in its entirety.

TECHNICAL FIELD

The present disclosure relates to a control device, a control method, and a program.

BACKGROUND ART

There has been proposed a laser light generation device which has a non-linear optical element in the resonator to effectively conduct wavelength conversion by the non-linear optical element, using high power density inside the resonator.

In the resonator utilized in such a laser light generation device, the non-linear optical element is provided between at least one pair of opposing mirrors that make up the resonator, and a fundamental-wave laser light enters into the resonator and passes through the non-linear element, for example. At this time, the distance between the mirrors (i.e., the light path length in the resonator) is controlled so as to coincide with an integer multiple of the incoming laser light, so that the laser light resonates in the resonator to generate laser oscillation.

For example, Patent Literature 1 discloses one example of the laser light generation device utilizing the resonator as described above. The laser light generation device according to Patent Literature 1 is configured to move the position of the mirror that makes up the resonator in the optical axis direction, and servocontrols the position of the mirror on the basis of the difference signal which is in proportion to the difference of the resonator length in relation to the incoming laser light of the resonator. By configuring like this, in the laser light generation device according to Patent Literature 1, the light path length of the resonator is automatically controlled so as to meet the condition under which the incoming laser light resonates in the resonator, and the resonance behavior of the incoming laser light of the resonator is stabilized.

CITATION LIST

Patent Literature

Patent Literature 1: JP H6-53593A

SUMMARY

Technical Problem

On the other hand, in recent years, it has not been rare to use a laser light source that oscillates in multi-modes, like a semiconductor laser, as a laser light source. When the laser light source that oscillates in the multi-modes is used as described above, the laser light source is combined with an external resonator, and the resonator length of the external resonator is adjusted to resonate in a desired mode, in order to use the laser light source as a light source having characteristics close to a single mode, in some cases.

When the laser light source that oscillates in the multi-modes is used, it is not rare that influence of light leaked from the resonator differs depending on modes, and the strength of the laser light output from the resonator differs depending on the modes, in some cases. In this case, the leaked light from the resonator is reduced to allow resonance in an efficient resonant mode, in order to obtain a laser light of higher strength.

However, the light path length of the resonator is not necessarily controlled to allow resonance in the mode of maximum strength of laser light, and in this case there is a not-small possibility that the performance of the laser light source is not fully utilized.

Thus, the present disclosure proposes a new and improved control device, a control method, and a program, which are capable of controlling a light path length of a resonator to allow resonance in a mode capable of obtaining a laser light of higher strength.

Solution to Problem

According to the present disclosure, there is provided a control device including: a drive section that moves, in an optical axis direction, at least one of a pair of reflecting units in a resonator that includes the at least a pair of reflecting units and a non-linear optical crystal, converts a wavelength of an entering laser light by resonating the laser light and has a plurality of modes that satisfy a resonance condition of the entering laser light; and a control section that controls a light path length of the resonator, by causing the drive section to move the at least one of reflecting units so that the laser light that enters into the resonator changes from a state in which the laser light resonates in a first mode of the plurality of modes to a state in which the laser light resonates in a second mode different from the first mode, on the basis of a detection result of a reflected light from the resonator.

According to the present disclosure, there is provided a control method including: moving, by a drive section, in an optical axis direction, at least one of a pair of reflecting units in a resonator that includes the at least a pair of reflecting units and a non-linear optical crystal, converts a wavelength of an entering laser light by resonating the laser light and has a plurality of modes that satisfy a resonance condition of the entering laser light; and controlling, by a processor, a light path length of the resonator, by causing the drive section to move the at least one of reflecting units so that the laser light that enters into the resonator changes from a state in which the laser light resonates in a first mode of the plurality of modes to a state in which the laser light resonates in a second mode different from the first mode, on the basis of a detection result of a reflected light from the resonator.

According to the present disclosure, there is provided a program for causing a computer to execute: a step of moving, in an optical axis direction, at least one of a pair of reflecting units in a resonator that includes the at least a pair of reflecting units and a non-linear optical crystal, converts a wavelength of an entering laser light by resonating the laser light and has a plurality of modes that satisfy a resonance condition of the entering laser light; and a step of controlling a light path length of the resonator, by moving the at least one of reflecting units so that the laser light that enters into the resonator changes from a state in which the laser light resonates in a first mode of the plurality of modes to a state in which the laser light resonates in a second mode different from the first mode, on the basis of a detection result of a reflected light from the resonator.

Effects

As described above, according to the present disclosure, a light path length of a resonator can be controlled to allow resonance in a mode capable of obtaining a laser light of higher strength.

Note that the above effects are not necessarily restrictive, but any effect described in the present specification or another effect that can be grasped from the present specification may be achieved along with the above effects or instead of the above effects.

DESCRIPTION OF EMBODIMENTS

Hereinafter, preferred embodiments of the present disclosure will be described in detail with reference to the appended drawings. Note that, in this specification and the drawings, elements that have substantially the same function and configuration are denoted with the same reference symbols, and redundant description is omitted.

Figure 1:
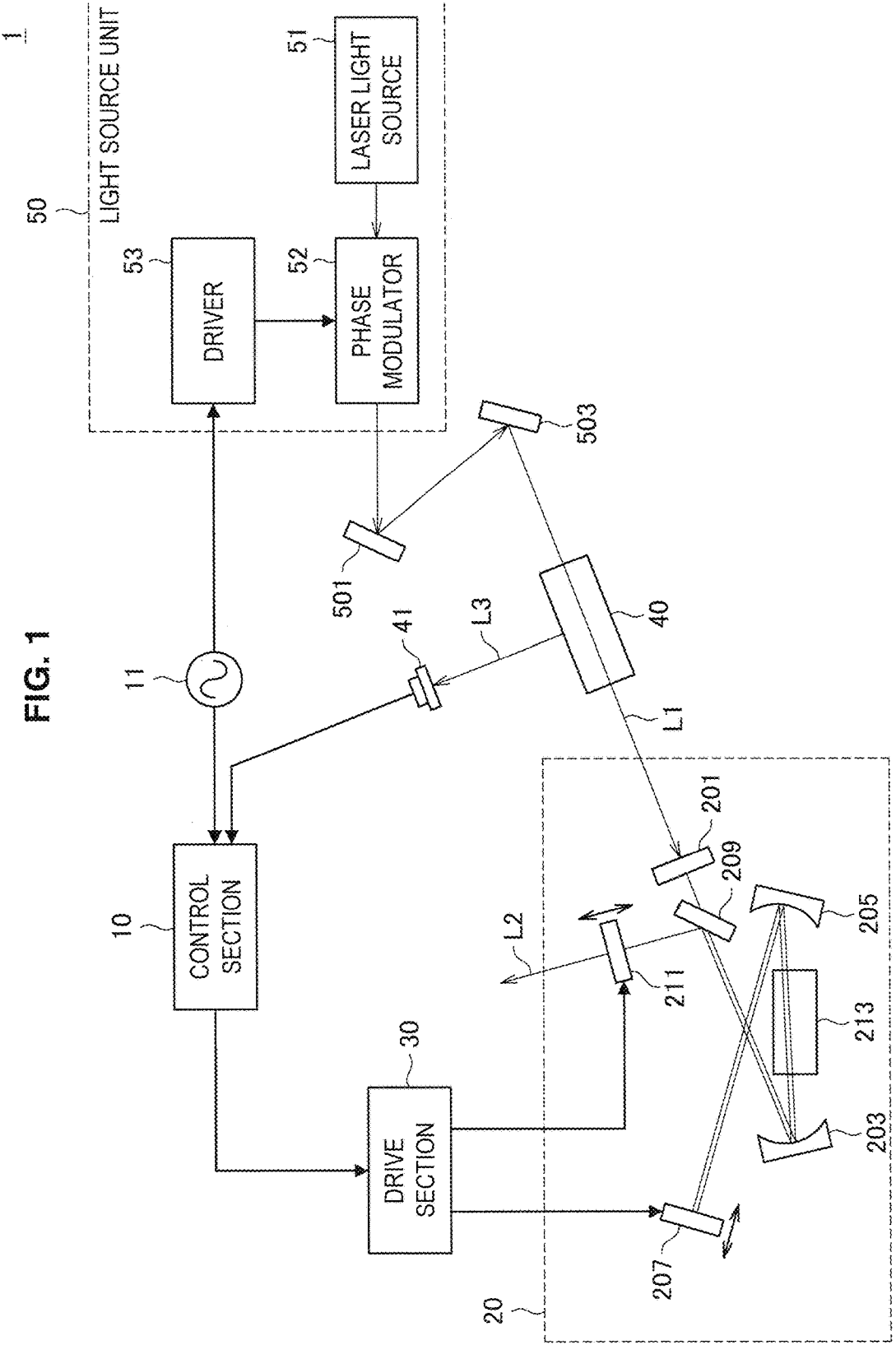
FIG. 1 is a configuration diagram illustrating one example of a schematic configuration of a laser light generation device according to an embodiment of the present disclosure.

Note that description will be made in the following order.
1. Configuration of Laser Light Generation Device
2. Pulling-in of Servo
3. Control Section According to Comparative Example
3.1. Configuration of Control Section
3.2. Servo Pulling-in Operation
3.3. Problem of Servo Pulling-in Operation According to Comparative Example
4. Control Section According to Present Embodiment
4.1. Configuration of Control Section
4.2. Servo Pulling-in Operation
4.3. Process Flow
4.4. Considerations
5. Exemplary Variant
5.1. Configuration of Laser Light Generation Device
5.2. Process Flow
5.3. Considerations
6. Hardware Configuration
7. Conclusion 1. Configuration of Laser Light Generation Device First, with reference to FIG. 1, description will be made of the configuration of a laser light generation device according to an embodiment of the present disclosure. FIG. 1 is a configuration diagram illustrating one example of a schematic configuration of a laser light generation device according to an embodiment of the present disclosure.

As illustrated in FIG. 1, the laser light generation device 1 according to the present embodiment includes an oscillator 11, a light source unit 50, mirrors 501 and 503, a resonator 20, an isolator 40, a photodetector 41, a drive section 30, and a control section 10.

The light source unit 50 includes a laser light source 51, a phase modulator 52, and a driver (a drive circuit) 53.

The laser light source 51 outputs a laser light, and can be configured with various types of lasers. In the laser light generation device 1 according to the present embodiment uses a device that oscillates in multi-modes, like a semiconductor laser for example, as the laser light source 51.

For example, the phase modulator 52 includes an electro-optics (EO) element and an acousto-optics (AO) element. A modulation signal of a frequency fm from the oscillator 11 is supplied by the driver 53, to the phase modulator 52. The phase modulator 52 modulates the laser light from the laser light source 51 by a modulation signal supplied from the driver 53, and sends out the modulated laser light L1 to the outside.

Note that the phase modulator 52 may be configured to output a laser light from the laser light source 51 as a pulse laser light, by being intermittently driven on the basis of control from the driver 53.

Also, the configuration of the light source unit 50 illustrated above is just an example, and is not necessarily limited to the configuration illustrated above. For example, when a semiconductor laser is used as the laser light source 51, the driver 53 may be configured to send out the modulated laser light L1, by directly driving the laser light source 51 on the basis of the modulation signal, without providing the phase modulator 52.

The laser light L1 sent out from the light source unit 50 is directed to the isolator 40 via the mirrors 501 and 503, and transmits the isolator 40, and enters into the inner portion of the resonator 20 from an input coupler 201. Note that it is needless to say that the elements of the optical system located in the light path are not limited to the mirrors 501 and 503, if the laser light L1 sent out from the light source unit 50 can be directed to the inner portion of the resonator 20 via the isolator 40.

The isolator 40 is interposed between the light source unit 50 and the resonator 20, and transmits the laser light L1 from the light source unit 50 toward the resonator 20. Also, the isolator 40 prevents a reflected light L3 from entering into the light source unit 50, by reflecting the reflected light (leaked light) L3 from the resonator 20 toward the photodetector 41 located in a direction different from the light source unit 50.

For example, the photodetector 41 is a photo detector (PD). The photodetector 41 detects the reflected light L3 from the resonator 20 directed via the isolator 40. Note that the reflected light L3 detected by the photodetector 41 is synchronously detected by the control section 10 described later.

The resonator 20 is what is called an optical parametric oscillator (OPO: Optical Parametric Oscillation), and resonates the laser light L1 from the light source unit 50 in the inner portion, and converts the wavelength of the laser light L1, and outputs the laser light L2 whose wavelength is converted. The detailed configuration of the resonator 20 will be described in the following. Note that, in the following, the laser light that enters into the resonator 20 is referred to as "excitation laser light", and the laser light whose wavelength is converted and which is output from the resonator 20 is referred to as "OPO laser light", in some cases.

The resonator 20 includes an input coupler 201, mirrors 203, 205, and 207, a dichroic mirror 209, an output coupler 211, and a non-linear optical element 213. The input coupler 201 and the output coupler 211 is generally a partial reflector (partial reflector mirror) having a transmissivity of several percent.

Also, the non-linear optical element 213 is provided between the mirror 203 and the mirror 205.

For example, KTP ($KTiOPO_4$), LN ($LiNbO_3$), QPMLN (quasi phase matching LN), BBO (beta-$BaB_2O_4$), LBO ($LiB_3O_4$), KN ($KNbO_3$) and the like are used as the non-linear optical element 213.

As one example, the non-linear optical element 213 converts the input laser light (i.e., the excitation laser light L1) into two wavelengths. Then, the laser light of at least one wavelength (for example, the longer wavelength) among the converted two wavelength resonates in the resonator 20 as the OPO laser light L2, and is output from the output coupler 211 to the outside of the resonator 20.

Also, the dichroic mirror 209 is provided between the input coupler 201 and the mirror 203. The dichroic mirror 209 allows the excitation laser light L1, among the light reflected toward the input coupler 201 by the mirror 203, to transmit through the dichroic mirror 209 toward the input coupler 201, and reflects the OPO laser light L2 toward the output coupler 211. By the configuration like this, the resonator 20 according to the present embodiment is made such that the excitation laser light L1 and the OPO laser light L2 are directed via the different light paths in the resonator 20. In the following, description will be made of the detail of the respective light paths of the excitation laser light L1 and the OPO laser light L4 in the resonator 20.

First, an attention is given to the light path of the excitation laser light L1. The excitation laser light L1 that has entered from the input coupler 201 into the inside of the resonator transmits through the dichroic mirror 209, reaches the mirror 207 via the mirror 203, the non-linear optical element 213, and the mirror 205, and is reflected at the mirror 207.

Also, the excitation laser light L1 reflected at the mirror 207 is directed via the mirror 205, the non-linear optical element 213, and the mirror 203 to the dichroic mirror 209, transmits through the dichroic mirror 209, and is directed to the input coupler 201.

The input coupler 201 reflects part of the directed excitation laser light L1, and sends out the other part to the outside of the resonator 20. In this way, the excitation laser light L1 that has entered into the resonator 20 repeats the reflection between the input coupler 201 and the mirror 207. That is, the light path between the input coupler 201 and the mirror 207 corresponds to the light path length (in other words, the resonator length) of the excitation laser light L1 in the resonator 20, and the light path length is adjusted to the resonance condition of the excitation laser light L1, so that the excitation laser light L1 resonates in the resonator 20.

Also, the excitation laser light sent out from the input coupler 201 to the outside of the resonator 20 is directed, as the reflected light from the resonator 20, toward the photodetector 41 by the isolator 40, and is detected at the photodetector 41.

Next, an attention is given to the light path of the OPO laser light L2. The excitation laser light L1 subjected to wavelength conversion at the non-linear optical element 213, i.e., the OPO laser light L2, reaches the mirror 207 via the mirror 205, and is reflected at the mirror 207.

Also, the OPO laser light L2 reflected at the mirror 207 is directed via the mirror 205, the non-linear optical element 213, and the mirror 203, to the dichroic mirror 209, and is reflected at the dichroic mirror 209 and directed to the output coupler 211.

The output coupler 211 reflects part of the directed OPO laser light L2, and sends out the other part to the outside of the resonator 20. In this way, the OPO laser light L2 that has entered into the resonator 20 repeats reflection between the output coupler 211 and the mirror 207. That is, the light path between the output coupler 211 and the mirror 207 corresponds to the light path length of the OPO laser light L2 in the resonator 20 (in other words, the resonator length), and the light path length is adjusted to the resonance condition of the OPO laser light L2, so that the OPO laser light L2 resonates in the resonator 20.

Next, description will be made of the behavior related to the adjustment of the respective light path lengths of the excitation laser light L1 and the OPO laser light L2 in the resonator 20. In the resonator 20 according to the present embodiment, the mirror 207 is configured such that the position is adjustable along the optical axis of the excitation laser light L1 and the OPO laser light L2 incident on the mirror 207 by driving a later-described drive section 30. Likewise, the output coupler 211 is configured such that the position is adjustable along the optical axis of the OPO laser light L2 incident on the output coupler 211 by driving the drive section 30.

In other words, by adjusting the position of the mirror 207, the respective light path lengths of the excitation laser light L1 and the OPO laser light L2 are adjusted. By adjusting the position of the output coupler 211, the light path length of the OPO laser light L2 is adjusted. For that reason, for example, the resonator 20 may be configured such that the position of the mirror 207 is adjusted to meet the resonance condition of the excitation laser light L1, and thereafter the position of the output coupler 211 is adjusted to meet the resonance condition of the OPO laser light L2. By adjusting the positions of the mirror 207 and the output coupler 211 in this order, the light path length can be controlled to meet the respective resonance conditions for the excitation laser light L1 and the OPO laser light L2.

For example, the drive section 30 includes an actuator device such as an electromagnetic actuator (VCM: Voice Coil Motor) and a piezoelectric element arrangement. Note that the following description will be described assuming that an electromagnetic actuator is used as the drive section 30.

The drive section 30 adjusts the position of the mirror 207 and the output coupler 211, on the basis of the control (i.e., the control signal supplied from the control section 10) by the control section 10 described later. Note that it is needless to say that the drive section 30 may be provided individually for each of the mirror 207 and the output coupler 211.

The control section 10 controls the positions of the mirror 207 and the output coupler 211 by controlling the operation of the drive section 30. Thereby, the control section 10 controls the light path length of each of the excitation laser light L1 and the OPO laser light L2 in the resonator 20.

Also, the control section 10 servocontrols the light path length of the excitation laser light L1, in such a manner that the light path length of the excitation laser light L1 in the resonator 20 at least satisfies a resonance condition of the excitation laser light L1.

Specifically, the control section 10 obtains a reflection signal by synchronously detecting the reflected light L3 from the resonator 20, which is detected by the photodetector 41, by sample and hold, on the basis of the signal of the frequency fm supplied from the oscillator 11.

The control section 10 generates a difference signal indicating the difference between the light path length of the excitation laser light L1 in the resonator 20 and the light path length that satisfies the resonance condition of the excitation laser light L1, on the basis of the acquired reflection signal, by the pound-drever-hall (PDH) method, for example. Note that it is needless to say that the method is not limited to the PDH method, as far as the difference signal can be generated.

Then, the control section 10 uses the generated difference signal as a pulling-in signal for servocontrolling the light path length of the excitation laser light L1, and servocontrols the light path length of the excitation laser light L1. Specifically, the control section 10 generates a driving signal for controlling the drive section 30 on the basis of the generated difference signal, and servocontrols the light path length of the excitation laser light L1 by causing the drive section 30 to adjust the position of the mirror 207 with the driving signal.

Note that the control section 10 can be configured with a control section, such as a basic processing unit (BPU) and a central processing unit (CPU), for example. Also, the control section 10 may include a storage, such as a random access memory (RAM) and a read only memory (ROM), for recording data and a program for executing the control described above.

Note that the detail of the operation of the control of the light path length of the excitation laser light L1 (i.e., the control of the position of the mirror 207) in the resonator 20 by the control section 10 will be described later in a separate manner.

In the above, with reference to FIG. 1, the configuration of the laser light generation device 1 according to the present embodiment has been described. Note that the control section 10 and the drive section 30 may be attached to the outside of the laser light generation device 1, as an external component of the laser light generation device 1. Also, the device including the control section 10 and the drive section 30 corresponds to an example of "control device".

2. Pulling-In of Servo

Figure 2:
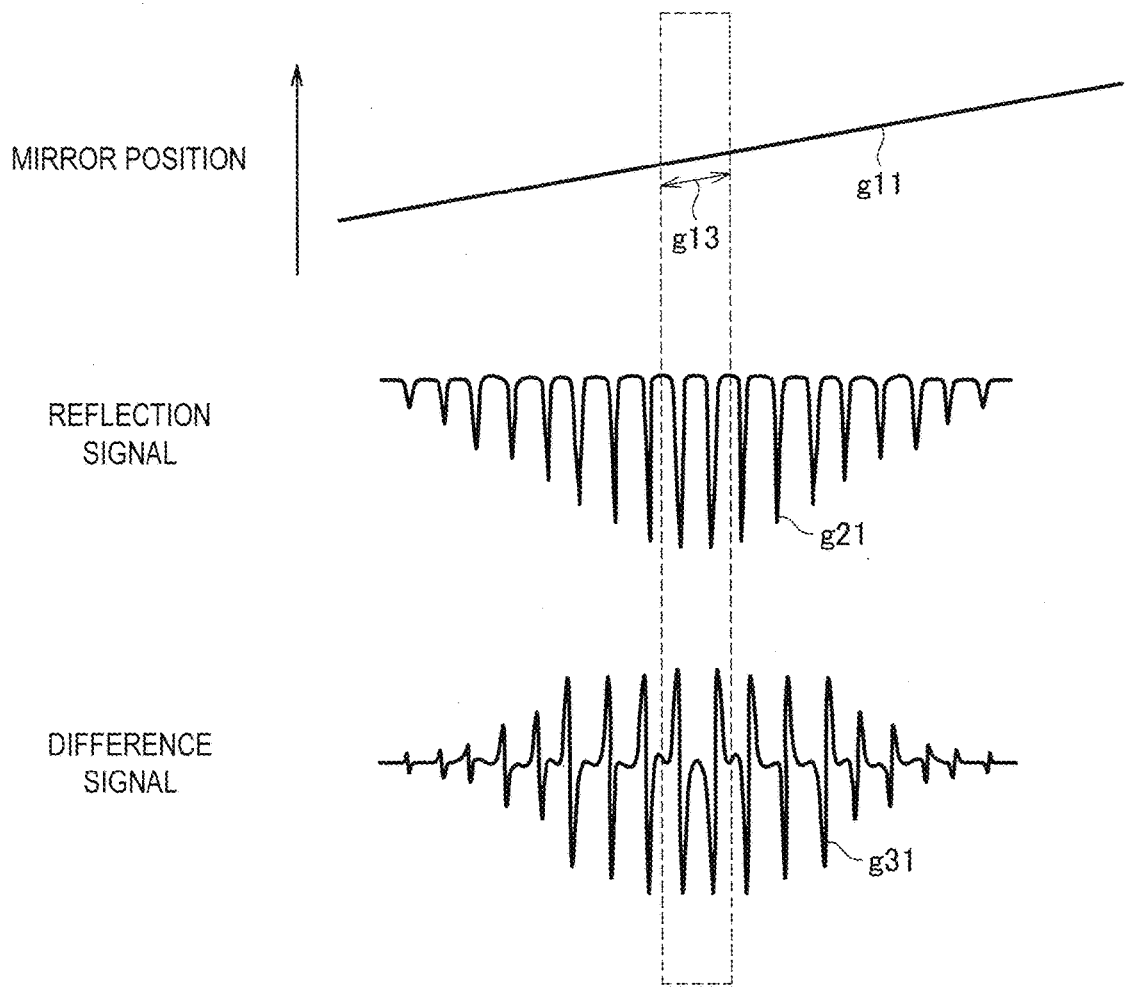
FIG. 2 is an explanatory diagram for describing pulling-in of servo when using a laser light source that oscillates in multi-modes.

Thereafter, in order to describe the detail of the control section 10 of the laser light generation device 1 according to the present embodiment, an overview will be first described with respect to pulling-in of servo when using a device that oscillates in multi-modes, like a semiconductor laser, as the laser light source 51, with reference to FIG. 2. FIG. 2 is an explanatory diagram for describing the pulling-in of the servo when using the laser light source that oscillates in the multi-modes.

In FIG. 2, the reference sign g11 indicates the position of the mirror 207, and the light path length of the excitation laser light L1 in the resonator 20 is decided according to the position of the mirror 207. Also, the reference sign g21 indicates a reflection signal obtained corresponding to each position of the mirror 207 illustrated with the reference sign g11 (in other words, a signal indicating the level of the reflected light L3). Also, the reference sign g31 indicates a difference signal based on the reflection signal g21.

When the light path length of the excitation laser light L1 in the resonator 20 satisfies the resonance condition of the excitation laser light L1, in other words, when the light path length is an integer multiple of the wavelength of the excitation laser light L1, the level (the strength) of the reflected light from the resonator 20 decreases. Hence, when the laser light source that oscillates in the multi-modes is used, there are a plurality of positions of the mirror 207 at which the level by of the reflected light decreases, in other words, the modes (the light path lengths), as illustrated in FIG. 2, and the difference signal is generated for each mode.

Also, as illustrated in FIG. 2, the level of the reflected light corresponding to each mode has a different tendency depending on the mode, and as the mode has a lower level of the reflected light, the leaked light from the resonator 20 reduces, and thus the OPO laser light L2 of higher output can be obtained. Hence, as illustrated in the range g13 in FIG. 2, it is more desirable to adjust the position of the mirror 207 to set the mode in which the reflection signal (i.e., the level of the reflected light L3) becomes the lowest.

3. Control Section According to Comparative Example

Next, the problem of the laser light generation device 1 according to the present embodiment will be sorted out, by describing a method for pulling in the servo by the control section according to a comparative example, by using a laser light generation device of the past as the comparative example.

3.1. Configuration of Control Section

Figure 3:
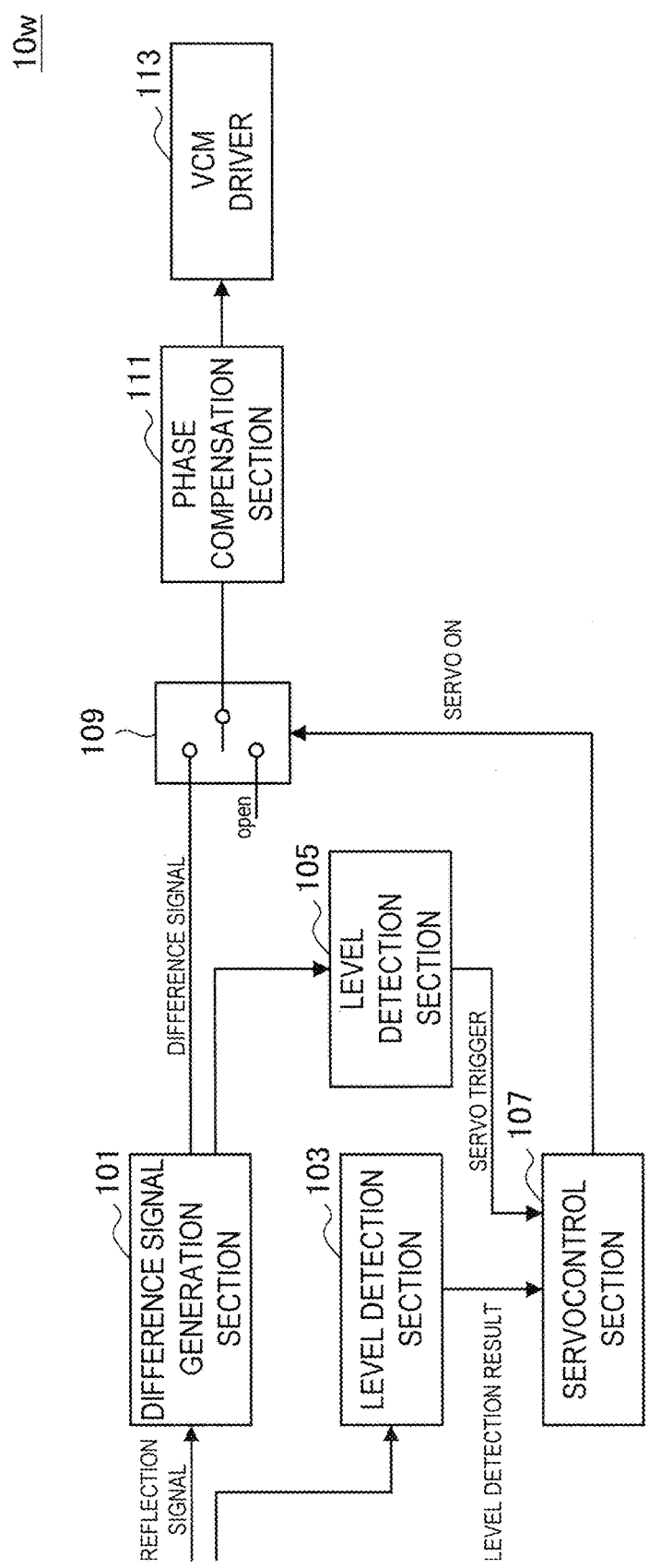
FIG. 3 is a block diagram illustrating an example of a function and configuration of a control section according to a comparative example.

First, the configuration of a control section 10w according to the comparative example will be described with reference to FIG. 3. FIG. 3 is a block diagram illustrating an example of the function and configuration of the control section 10w according to the comparative example.

As illustrated in FIG. 3, the control section 10w according to the comparative example includes a difference signal generation section 101, level detection sections 103 and 105, a servocontrol section 107, a switch 109, a phase compensation section 111, and a VCM driver 113.

The difference signal generation section 101 obtains a reflection signal by synchronously detecting the reflected light L3 from the resonator 20 detected by the photodetector 41 by sample and hold, on the basis of the signal of the frequency fm supplied from the oscillator 11. The difference signal generation section 101 generates a difference signal indicating the difference between the light path length of the excitation laser light L1 in the resonator 20 and the light path length that satisfies the resonance condition of the excitation laser light L1, on the basis of the acquired reflection signal.

Note that the PDH method can be preferably used in the generation of the difference signal, for example. As a specific example, a side band fc±fm is established by phase modulation by the phase modulator 52, where the frequency of the laser light sent out from the laser light source 51 is fc, and the modulation frequency of the laser light is fm. The difference signal generation section 101 obtains a miscalculation signal by detecting a beat of the frequencies fc and fc±fm, with respect to the supplied reflected light L3.

As described above, the difference signal generation section 101 generates the difference signal on the basis of the reflection signal obtained by synchronously detecting the reflected light L3, and sequentially outputs the generated difference signal to the level detection section 105 and the switch 109.

The level detection section 103 sequentially acquires the detection result of the reflected light L3 from the resonator 20, from the photodetector 41, at a predetermined sampling rate (for example, the frequency fm supplied from the oscillator 11). Note that, the level detection section 103 may acquire the reflection signal synchronously detected by the sample and hold as the detection result of the detection result of the reflected light L3, on the basis of the signal of the frequency fm supplied from the oscillator 11.

Then, the level detection section 103 detects the level of the reflected light L3 on the basis of the acquired detection result. In this case, as illustrated in FIG. 2, the level of the detected reflected light L3 changes depending on whether or not the light path length of the excitation laser light L1 in the resonator 20 satisfies the resonance condition of the excitation laser light L1, as the mirror position moves. The level detection section 103 outputs a signal indicating the detection result of the level to the servocontrol section 107, when the level of the detected reflected light L3 becomes lower than a predetermined threshold value.

The level detection section 105 sequentially acquires the generated difference signal, from the difference signal generation section 101. Then, the level detection section 105 detects a zero cross level of the acquired difference signal, and generates a servo trigger indicating a timing for starting the servocontrol of the resonator length of the resonator 20 (i.e., the light path length of the excitation laser light L1 in the resonator 20) according to each mode, on the basis of the detection timing of the zero cross level. The level detection section 105 sequentially outputs the generated servo trigger to the servocontrol section 107.

The servocontrol section 107 sequentially acquires the servo trigger pulse from the level detection section 105. Then, upon acquiring the signal indicating the detection result of the level of the reflected light L3 from the level detection section 103, the servocontrol section 107 supplies a signal indicating the start of the servo to the switch 109, on the basis of the servo trigger pulse supplied at the timing when the signal is acquired.

The switch 109 is configured to switch the connection relationship between the difference signal generation section 101 provided in the prior stage and the phase compensation section 111 provided in the subsequent stage, on the basis of the signal supplied from the servocontrol section 107. Specifically, when the signal indicating the start of the servo is supplied from the servocontrol section 107, the switch 109 changes into an ON state in order to connect between the difference signal generation section 101 and the phase compensation section 111. Thereby, the difference signal output from the difference signal generation section 101 is supplied to the phase compensation section 111.

The phase compensation section 111 receives the supply of the difference signal from the difference signal generation section 101, by the switch 109 that changes into the ON state. The phase compensation section 111 compensates the phase of the difference signal from the difference signal generation section 101, and supplies the difference signal whose phase is compensated to the VCM driver 113.

The VCM driver 113 performs the pulling-in of the servo (i.e., adjustment of the position of the mirror 207), by driving the drive section 30, on the basis of the difference signal supplied from the phase compensation section 111.

3.2. Pulling-In Operation of Servo

Figure 4:
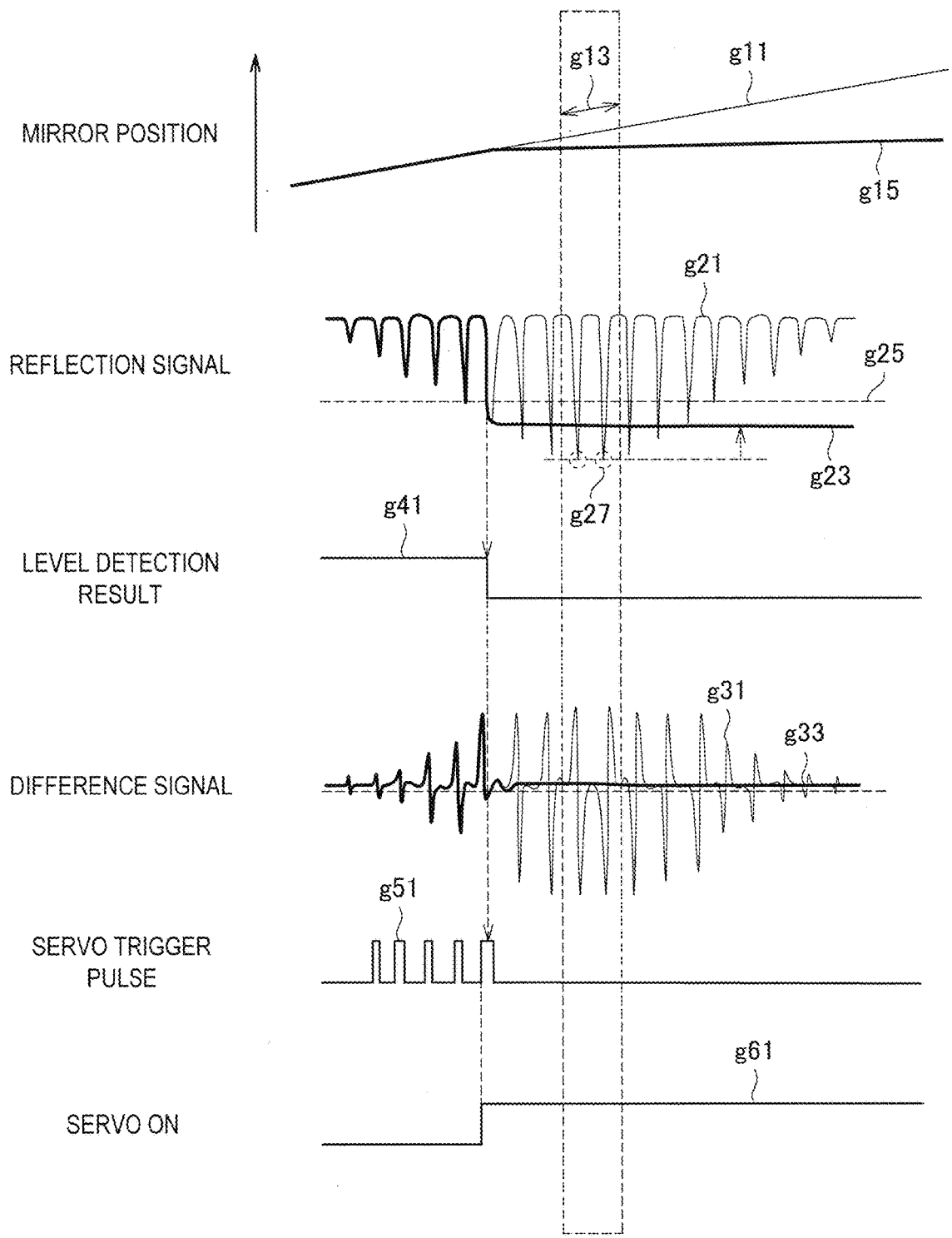
FIG. 4 is an explanatory diagram for describing an example of servo pulling-in operation by a control section according to a comparative example.

Next, with reference to FIG. 4, the detail of the pulling-in operation of the servo by the control section 10w according to the comparative example will be described. FIG. 4 is an explanatory diagram for describing an example of the pulling-in operation of the servo by the control section 10w according to the comparative example. Note that the reference symbols g11, g21, g31, and g13 in FIG. 4 correspond to the position g11 of the mirror 207, the reflection signal g21, the difference signal g31, and the range g13 in which the detection result of the reflected light L3 becomes the lowest, in FIG. 2, respectively.

The control section 10w controls the light path length of the excitation laser light L1 in the resonator 20, by causing the drive section 30 to adjust the position of the mirror 207 in the resonator 20, and acquires the detection result of the reflected light L3 from the resonator 20 according to the light path length, from the photodetector 41.

The difference signal generation section 101 of the control section 10w synchronously detects the reflected light L3 from the resonator 20 which is detected by the photodetector 41, in order to obtain the reflection signal g21. The difference signal generation section 101 generates the difference signal g31 on the basis of the acquired reflection signal.

The level detection section 105 sequentially acquires the generated difference signal g31 from the difference signal generation section 101, and detects the zero cross level of the difference signal g31, and generates the servo trigger g51 on the basis of the detection timing of the zero cross level. The level detection section 105 sequentially outputs the generated servo trigger g51 to the servocontrol section 107.

Also, the level detection section 103 sequentially acquires the detection result of the reflected light L3 from the resonator 20, from the photodetector 41, at a predetermined sampling rate (for example, the frequency fm supplied from the oscillator 11), and compares the level of the detected reflected light L3 with a threshold value g25.

Note that the threshold value g25 is decided in advance according to the output of the laser light L1 output from the light source unit 50 and the characteristics of the resonator 20. As a specific example, the level of the reflected light L3 from the resonator 20 may be measured by an experiment or the like in advance, in order to decide the threshold value g25 on the basis of the minimum value of the reflected light L3 obtained by the measurement result.

The level detection section 103 outputs a signal g41 indicating the detection result of the level to the servocontrol section 107, at the timing at which the level of the detected reflected light L3 becomes lower than the predetermined threshold value g25.

The servocontrol section 107 supplies a signal g61 indicating the start of the servo, to the switch 109, on the basis of the servo trigger pulse g51 sequentially supplied from the level detection section 105 and the signal g41 indicating the detection result of the level of the reflected light L3 supplied from the level detection section 103. As a specific example, when receiving the signal g41 from the level detection section 103, the servocontrol section 107 supplies the signal g61 indicating the start of the servo to the switch 109, by utilizing a rise of the servo trigger g51 supplied at the timing when the signal g41 is received (the timing when the signal g41 changes into an ON state).

When the signal g61 indicating the start of the servo is supplied to the switch 109, the switch 109 changes into an ON state, and the difference signal output from the difference signal generation section 101 is supplied to the phase compensation section 111.

The phase compensation section 111 receives the supply of the difference signal from the difference signal generation section 101, by the switch 109 that changes into the ON state, and compensates the phase of the difference signal, and supplies the difference signal whose phase is compensated to the VCM driver 113.

The VCM driver 113 performs the pulling-in of the servo (i.e., adjustment of the position of the mirror 207), by driving the drive section 30, on the basis of the difference signal supplied from the phase compensation section 111. That is, the drive section 30 adjusts the position of the mirror 207 in such a manner that the light path length of the excitation laser light L1 in the resonator 20 becomes the mode corresponding to the timing when the servo is started, as illustrated with the reference sign g15 of FIG. 4.

Also, as the VCM driver 113 servocontrols the light path length of the excitation laser light L1, the mode of the resonator 20 is locked, and therefore the level of the reflected light L3 becomes constant as illustrated with the reference sign g23 of FIG. 4, and the difference signal is stabilized as illustrated with the reference sign g33.

3.3. Problem of Pulling-In Operation of Servo According to Comparative Example On the other hand, when identifying the timing for performing the pulling-in of the servo on the basis of the comparison between the level of the reflected light L3 and the threshold value g25, it is not rare that the threshold value g25 is set at a value higher than the minimum value of the reflected light L3 obtained in prior measurement, in order to perform the pulling-in of the servo without failure.

Hence, when the pulling-in of the servo is performed on the basis of the comparison between the level of the reflected light L3 and the threshold value g25, as in the control section 10w according to the comparative example, it is not rare that the mode for operating the laser light generation device is different from the mode g27 of the minimum level of the reflected light L3. That is, the laser light generation device that employs the control section 10w according to the comparative example does not operate in the mode g27 of the minimum level of the reflected light L3, in other words, the mode of the maximum output of the OPO laser light L2 in some cases, and thus the performance of the laser light source is not fully utilized in some cases.

Thus, in the laser light generation device according to the present embodiment, a purpose is to control the light path length of the resonator to resonate in the mode capable of obtaining the laser light of a higher strength, in other words, the mode of the minimum reflected light (leaked light) from the resonator 20. In the following, the laser light generation device 1 according to the present embodiment will be described, particularly focusing on the configuration of the control section 10.

4. Control Section According to Present Embodiment

4.1. Configuration of Control Section

Figure 5:
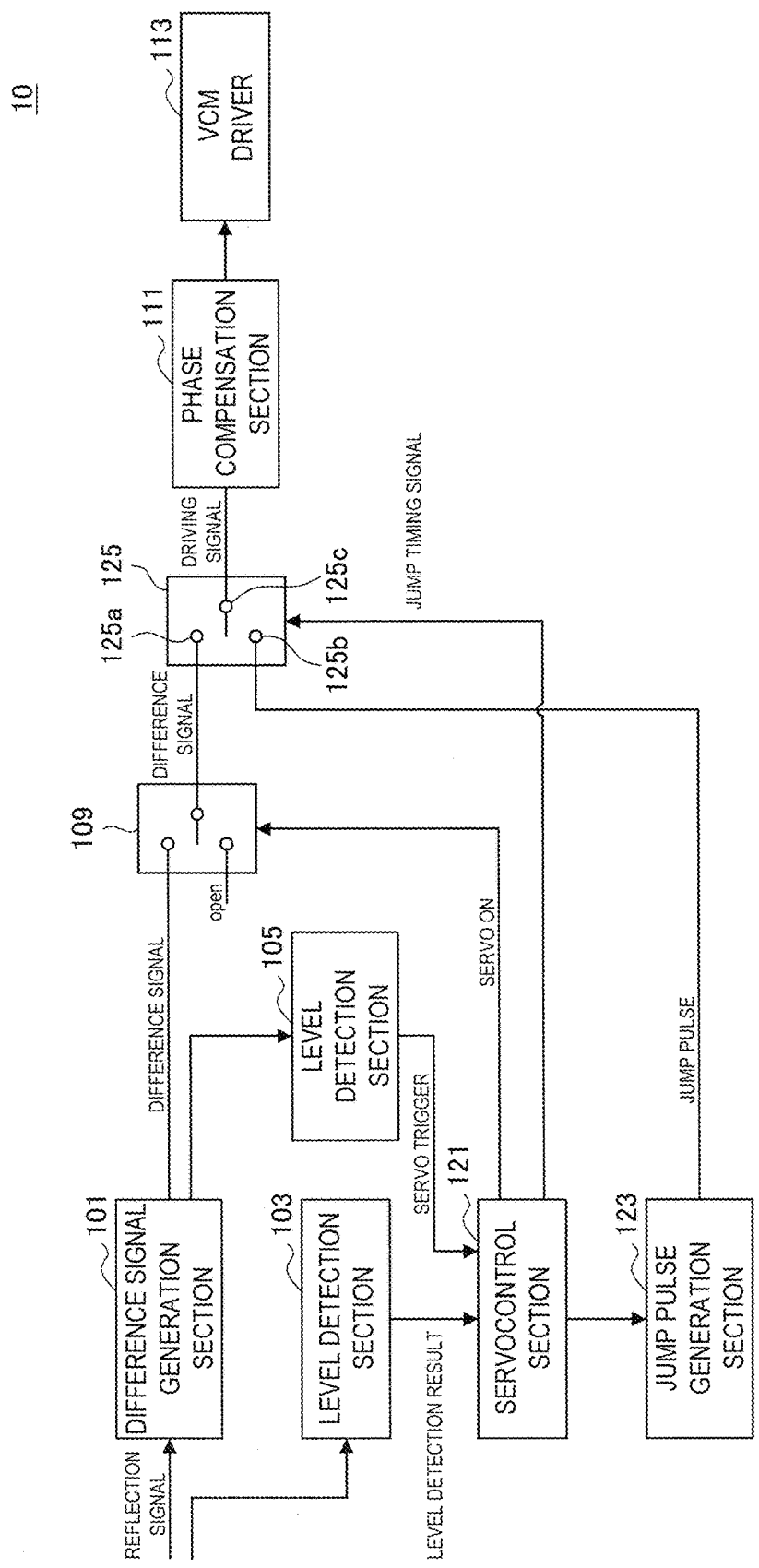
FIG. 5 is a block diagram illustrating an example of a function and configuration of a control section according to an embodiment of the present disclosure.

First, the configuration of the control section 10 according to the present embodiment will be described with reference to FIG. 5. FIG. 5 is a block diagram illustrating an example of the function and configuration of the control section 10 according to the present embodiment.

As illustrated in FIG. 5, the control section 10 according to the present embodiment includes a difference signal generation section 101, level detection sections 103 and 105, a switch 109, a servocontrol section 121, a jump pulse generation section 123, a switch 125, a phase compensation section 111, and a VCM driver 113.

Note that the difference signal generation section 101, the level detection sections 103 and 105, the switch 109, the phase compensation section 111, and the VCM driver 113 are similar to the control section 10w (refer to FIG. 3) according to the aforementioned comparative example, and thus their detailed description will be omitted, and only overview will be described.

That is, the difference signal generation section 101 acquires the reflection signal by synchronously detecting the reflected light L3 from the resonator 20 which is detected by the photodetector 41, and generates the difference signal on the basis of the acquired reflection signal. The difference signal generation section 101 sequentially outputs the generated difference signal to the level detection section 105 and the switch 109.

The level detection section 103 sequentially acquires the detection result of the reflected light L3 from the resonator 20 from the photodetector 41, and detects the level of the reflected light L3 on the basis of the acquired detection result. The level detection section 103 outputs a signal indicating the detection result of the level to the servocontrol section 107, at the timing when the level of the detected reflected light L3 becomes lower than a predetermined threshold value.

The level detection section 105 detects the zero cross level of the difference signal by sequentially acquiring the generated difference signal from the difference signal generation section 101, and generates a servo trigger on the basis of the detection timing of the zero cross level. Then, the level detection section 105 sequentially outputs the generated servo trigger to the servocontrol section 107.

The switch 109 is interposed between the difference signal generation section 101 and the switch 125, and is configured to switch the connection relationship between the difference signal generation section 101 and the switch 125 on the basis of the signal supplied from the servocontrol section 107. That is, when the signal indicating the start of the servo is supplied from the servocontrol section 107, the switch 109 changes into an ON state, and connects between the difference signal generation section 101 and the switch 125. Thereby, the difference signal output from the difference signal generation section 101 is supplied to the switch 125. The above operation is similar to the control section 10w according to the aforementioned comparative example.

The switch 125 includes terminals 125a to 125c. The terminal 125a is connected to a signal line from the switch 109, and the terminal 125b is connected to a signal line from the jump pulse generation section 123. Also, the terminal 125c is connected to a signal line from the phase compensation section 111. The switch 125 is configured to be switchable, so that the terminal 125c is connected to one of the terminals 125a and 125b. That is, the switch 125 can switch between a state in which the switch 109 and the phase compensation section 111 are connected to each other and a state in which the jump pulse generation section 123 and the phase compensation section 111 are connected to each other. Switch of the switch 125 is controlled by a jump timing signal supplied from the servocontrol section 121.

When the switch 109 is in an ON state, the difference signal is supplied from the difference signal generation section 101 to the terminal 125a. That is, when the switch 125 is switched in such a manner that the terminal 125a and the terminal 125c are connected to each other, the difference signal from the difference signal generation section 101 is supplied to the phase compensation section 111 via the switch 109.

Also, the jump pulse is supplied from the jump pulse generation section 123 to the terminal 125b. That is, when the switch 125 is switched in such a manner that the terminal 125b and the terminal 125c are connected to each other, the jump pulse is supplied from the jump pulse generation section 123 to the phase compensation section 111. Note that the detail of the jump pulse will be described later in a separate manner.

The servocontrol section 121 sequentially acquires the servo trigger pulse from the level detection section 105. Then, upon acquiring the signal indicating the detection result of the level of the reflected light L3 from the level detection section 103, the servocontrol section 121 supplies a signal indicating the start of the servo to the switch 109, on the basis of the servo trigger pulse supplied at the timing when the signal is acquired. Also, in this case, the servocontrol section 121 supplies the control signal to the switch 125, in such a manner that the terminal 125a and the terminal 125c of the switch 125 are connected to each other. Thereby, the switch 109 turns into an ON state, and the terminal 125a and the terminal 125c of the switch 125 are connected to each other, and the difference signal is supplied from the difference signal generation section 101 to the phase compensation section 111 via the switch 109 and the switch 125.

Thereafter, the phase compensation section 111 performs phase compensation of the difference signal, and the VCM driver 113 drives the drive section 30 on the basis of the difference signal whose phase is compensated, in order to performed the pulling-in of the servo. Note that the control of the initial pulling-in of the servo described in above is similar to the pulling-in control of the servo based on the comparison between the level of the reflected light L3 and the threshold value g25, which is illustrated in FIG. 4. Also, in the following, this pulling-in control of the servo based on the comparison between the level of the reflected light L3 and the threshold value g25 is referred to as "initial pulling-in", in some cases.

When the initial pulling-in of the servo is completed, the servocontrol section 121 changes the light path length of the excitation laser light L1 in the resonator 20, so that the set mode sequentially is switched to another mode different from the set mode.

In this case, the servocontrol section 121 causes the jump pulse generation section 123 to generate a jump pulse for adjusting the position of the mirror 207 so as to jump between modes, and supply the jump pulse to the terminal 125b of the switch 125. Note that, in the following, the operation for adjusting the position of the mirror 207 to jump between modes is referred to as "mode jump", in some cases.

Also, the servocontrol section 121 supplies, to the switch 125, the control signal (hereinafter, sometimes referred to as "jump timing signal") for switching the switch 125 in such a manner that the terminal 125b and the terminal 125c are connected to each other, synchronously with the timing when the jump pulse generation section 123 supplies the jump pulse to the terminal 125b.

That is, the terminal 125b and the terminal 125c are connected to each other by the jump timing signal, in order to stop supply of the difference signal to the VCM driver 113 via the phase compensation section 111, and alternatively the jump pulse is supplied to the VCM driver 113 as the driving signal. Thereby, the VCM driver 113 temporarily stops the servocontrol of the light path length of the excitation laser light L1 in the resonator 20, and controls the light path length in such a manner that the set mode changes to another mode, while stopping the servocontrol.

As described above, the servocontrol section 121 sequentially switches the mode, and acquires the detection result of the level of the reflected light L3 from the level detection section 103, with respect to each switched mode. Then, the servocontrol section 121 identifies the mode of the minimum level of the reflected light L3, on the basis of the detection result of the level of the reflected light L3 acquired for each mode, and controls the light path length of the excitation laser light L1 in the resonator 20, so as to allow the resonance in the identified mode. Note that the detail of the above described operation of the mode jump and the operation of the identification of the mode of the minimum level of the reflected light L3 will be described later separately in [4.2. Pulling-in Operation of Servo].

Note that, when the light path length of the excitation laser light L1 in the resonator 20 is controlled, i.e., the position of the mirror 207 is changed, the light path length of the OPO laser light L2 in the resonator 20 is also changed. For that reason, it is needless to say that, when the servocontrol section 121 controls the position of the mirror 207, the servocontrol driver 313 may control the light path length of the OPO laser light L2 as well, by adjusting the position of the output coupler 211 in response to the control amount of the position of the mirror 207.

In the above, with reference to FIG. 5, the function and configuration of the control section 10 according to the present embodiment have been described.

4.2. Pulling-In Operation of Servo

Next, the operation of the mode jump, and the operation of the identification of the mode of the minimum level of the reflected light L3 will be described with reference to FIGS. 6 to 8.

First, with reference to FIG. 6, the detail of the jump pulse and the relationship between the jump pulse, the jump timing signal, and the driving signal will be described. The explanatory diagram for describing the detail of the process of generation of the driving signal illustrates the schematic time chart of the jump pulse, the jump timing signal, and the driving signal.

Figure 6:
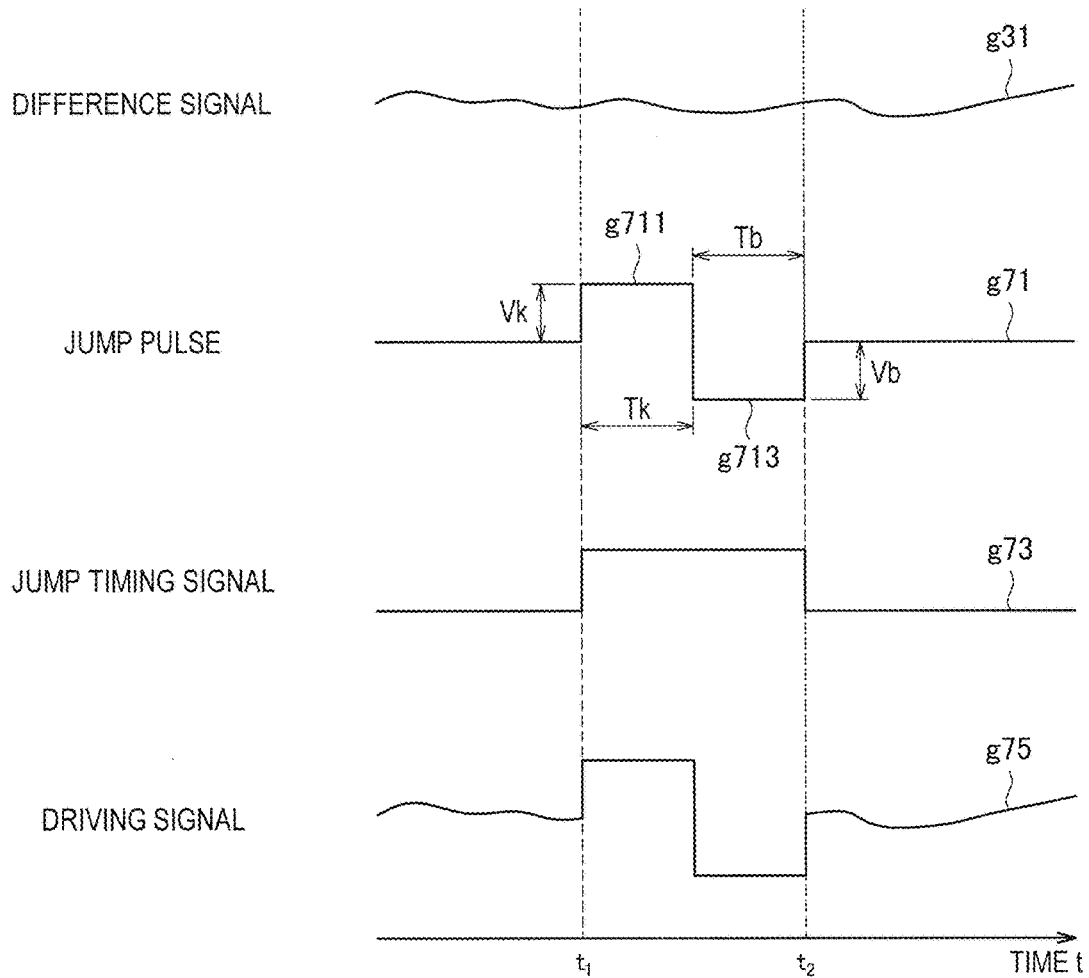
FIG. 6 is an explanatory diagram for describing a detail of a process of generation of a driving signal.

In FIG. 6, the reference sign g31 indicates a difference signal generated by the difference signal generation section 101 that synchronously detects the reflected light L3 from the resonator 20. The VCM driver 113 can servocontrol the light path length of the excitation laser light L1, by adjusting the position of the mirror 207 by using the difference signal as the driving signal.

Also, the reference sign g71 indicates a jump pulse generated by the jump pulse generation section 123. As illustrated in FIG. 6, the jump pulse g71 includes a kick pulse g711 and a brake pulse g713.

The kick pulse g711 is a driving signal for moving the position of the mirror 207 a predetermined distance. The distance that the mirror 207 is moved by the kick pulse g711 is decided by the amplitude Vk and the pulse width Tk of the kick pulse g711 and the characteristics of the VCM driver 113 and the drive section 30. Hence, for example, the relationship between the amplitude Vk and the pulse width Tk of the kick pulse g711 and the control amount of the position of the mirror 207 by the VCM driver 113 and the drive section 30 may be surveyed in advance, so that the amplitude Vk and the pulse width Tk is decided on the basis of the survey result.

Also, the direction in which the mirror 207 moves is controlled, depending on the direction of the amplitude Vk of the kick pulse g711, in other words, positive and negative. For example, when the amplitude Vk of the kick pulse g711 is positive, the position of the mirror 207 is controlled to move in the direction that elongates the light path length along the optical axis direction of the excitation laser light L1 in the resonator 20. In this case, when the amplitude Vk is negative, the position of the mirror 207 is controlled to move in the direction that shortens the light path length. Note that, in the following, the direction that elongates the light path length of the excitation laser light L1 in the resonator 20 is referred to as "+ (plus) direction", and the direction that shortens the light path length is referred to as "− (minus) direction", in some cases.

The brake pulse g713 is a signal for braking toward the opposite direction to the movement direction of the mirror 207, to stop the mirror 207 moved by the kick pulse g711. Hence, the brake pulse g713 is formed as a signal whose positive and negative are reversed in relation to the kick pulse g711.

The load amount for braking the moving mirror 207 by the brake pulse g713 is decided based on the amplitude Vb and the pulse width Tb of the brake pulse g713 and the characteristics of the VCM driver 113 and the drive section 30. Hence, in a similar way as the kick pulse g711, the relationship between the amplitude Vb and the pulse width Tb and the control amount of the mirror 207 by the VCM driver 113 and the drive section 30 may be surveyed in advance, in order to decide the amplitude Vb and the pulse width Tb on the basis of the survey result.

As described above, the jump pulse g71 including the kick pulse g711 and the brake pulse g713 is used as the driving signal that the position of the mirror 207 adjusts, in order to intermittently move the position of the mirror 207 by a predetermined distance in a predetermined direction.

In particular, the jump pulse generation section 123 generates the jump pulse g71 by adjusting the amplitudes Vk and Vb and the pulse widths Tk and Tb, in such a manner that the movement distance of the mirror 207 is an integer multiple of ½ wavelength of the excitation laser light L1 along the optical axis direction of the excitation laser light L1. Note that, when the mirror 207 moves by ½ wavelength of the excitation laser light L1 along the optical axis direction, the light path length of the excitation laser light L1 in the resonator 20 changes by one wavelength of the excitation laser light L1. Hence, the position of the mirror 207 is controlled on the basis of the jump pulse g71 generated as described above, and thereby the position of the mirror 207 is adjusted to jump between the modes.

The reference sign g73 indicates a jump timing signal for causing the servocontrol section 121 to switch the switch 125.

Here, FIG. 5 is referred to in addition. When the jump timing signal g73 is turned into an OFF state, the switch 125 is switched in such a manner that the terminal 125a and the terminal 125c of the switch 125 are connected to each other. That is, in this case, the difference signal g31 generated by the difference signal generation section 101 is supplied, as the driving signal, to the VCM driver 113 via the switch 109, the switch 125, and the phase compensation section 111.

Also, when the jump timing signal g73 is turned into an ON state, the switch 125 is switched in such a manner that the terminal 125b and the terminal 125c of the switch 125 are connected to each other. Hence, in this case, the jump pulse g71 generated by the jump pulse generation section 123 is supplied, as the driving signal, to the VCM driver 113 via the switch 125 and the phase compensation section 111.

Note that, as described above, the servocontrol section 121 supplies the jump timing signal g73 to the switch 125, synchronously with the timing when the jump pulse generation section 123 supplies the jump pulse to the terminal 125b. Specifically, in the example illustrated in FIG. 6, the servocontrol section 121 controls the jump timing signal g73 into an ON state, synchronously with the timing t1 when the kick pulse g711 rises. Also, the servocontrol section 121 controls the jump timing signal g73 into an OFF state, synchronously with the timing t2 when the brake pulse g713 rises.

By the above control, the driving signal indicated by the reference sign g75, in other words, the driving signal that combines the difference signal g31 and the jump pulse g71 is supplied to the VCM driver 113 in temporal sequence. Note that the VCM driver 113 causes the drive section 30 to control the position of the mirror 207 on the basis of the driving signal g75, in order to once stop the servocontrol based on the difference signal g31 when performing the mode jump, and to restart the servocontrol after the completion of the mode jump. With this configuration, the mode jump is performed smoothly, in the control section 10 according to the present embodiment.

In the above, with reference to FIG. 6, the detail of the jump pulse and the relationship between the jump pulse, the jump timing signal, and the driving signal have been described.

Next, with reference to FIGS. 7 and 8, an example of operation of identification of the mode of the minimum level of the reflected light L3 will be described. First, FIG. 7 is referred to. FIG. 7 is an explanatory diagram for describing an example of the pulling-in operation of the servo by the control section 10 according to the present embodiment.

The control section 10 first compares the level of the reflected light L3 (in other words, the reflection signal g21) from the resonator 20 detected by the photodetector 41 with the threshold value g25, and performs pulling-in (i.e., initial pulling-in) of the servo at the timing when the level of the reflected light L3 becomes lower than the predetermined threshold value g25. The position of the mirror 207 is adjusted to a position corresponding to the mode indicated by the reference sign i in FIG. 7, by this initial pulling-in of the servo.

When the initial pulling-in of the servo is completed, the control section 10 first controls the position of the mirror 207 in such a manner that the mode switches (i.e., mode jump) sequentially toward a predetermined direction, as indicated with the reference sign g81. For example, in the example illustrated in FIG. 7, the control section 10 controls the position of the mirror 207, so as to sequentially mode-jump to an adjacent mode. Then, the control section 10 acquires the level of the reflected light L3 with respect to each switched mode.

Figure 7:
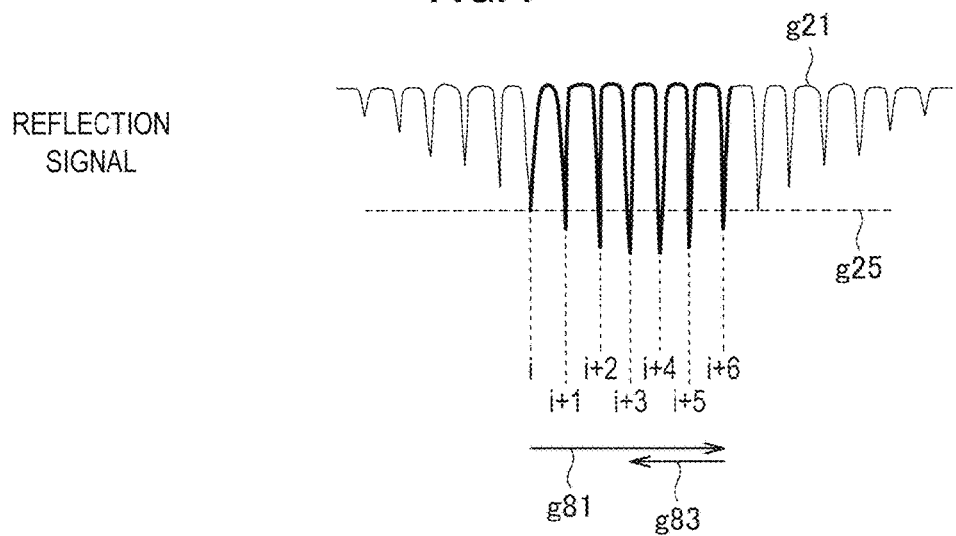
FIG. 7 is an explanatory diagram for describing an example of servo pulling-in operation by a control section according to the same embodiment.

For example, in the example illustrated in FIG. 7, the control section 10 controls the position of the mirror 207 to perform the mode jump sequentially as indicated with the reference sign g81, from a starting point of the mode i immediately after initial pulling-in to the modes i+1, i+2, . . . , i+6.

As described above, the control section 10 compares the levels of the reflected light L3 between before and after the mode jump, while performing the mode jump sequentially, and identifies the mode of the lowest level of the reflected light L3.

Figure 8:
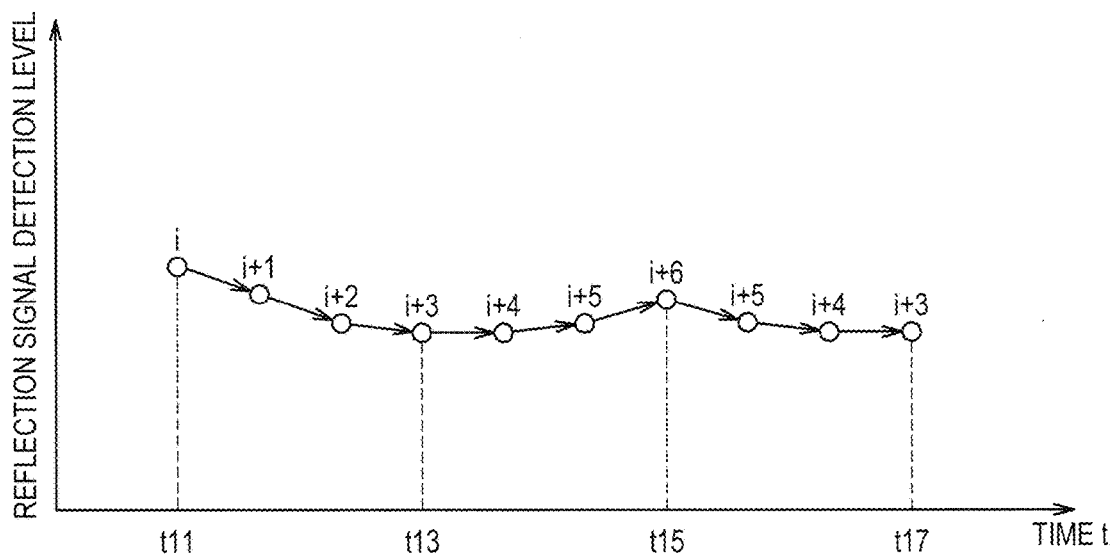
FIG. 8 is an explanatory diagram for describing an example of servo pulling-in operation by a control section according to the same embodiment.

Here, FIG. 8 is referred to. FIG. 8 is an explanatory diagram for describing an example of the pulling-in operation of the servo by the control section according to the embodiment, and illustrates a change of the level of the reflected light L3 associated with the mode jump in the example illustrated in FIG. 7. In FIG. 8, the horizontal axis represents time t, and the vertical axis represents the level of the reflected light L3. Also, the reference sign t11 indicates a timing immediately after the initial pulling-in of the servo. That is, at the timing t11, the position of the mirror 207 is adjusted to the position corresponding to the mode i.

For example, in the example illustrated in FIG. 7, when the mirror 207 is positioned at the position corresponding to the mode i+3 as illustrated in FIG. 8, in other words, at the timing t13, the level of the reflected light L3 becomes the lowest. In this case, the control section 10 detects that the change of the level of the reflected light L3 changes from − (minus) to + (plus), with the mode i+3 as the boundary, on the basis of the comparison result of the levels of the reflected light L3 between the modes i+2 and i+3 and between the modes i+3 and i+4. Thereby, the control section 10 sets the mode i+3, as the optimal point, in other words, the mode of the minimum level of the reflected light L3.

When the optimal point is set, the control section 10 controls the position of the mirror 207 to mode-jump by a predetermined number of modes, from the optimal point, and acquires the level of the reflected light L3 in each mode. For example, in the example illustrated in FIG. 7, the control section 10 controls the position of the mirror 207 to mode-jump by 3 modes (i.e., to mode-jump to the mode i+6) with respect to the mode i+3.

Then, the control section 10 compares the acquired level of the reflected light L3 in each mode with the level of the reflected light L3 at the optimal point.

For example, in the example illustrated in FIGS. 7 and 8, the level of the reflected light L3 in the mode i+3 set as the optimal point is smaller than the level of the reflected light L3 in any mode of the modes i+4 to i+6. As described above, when the level of the reflected light L3 at the optimal point is minimum, the control section 10 moves the mirror 207 to the position corresponding to the optimal point, and completes the operation of the pulling-in of the servo. For example, in the example illustrated in FIG. 7, the control section 10 controls the position of the mirror 207, so as to mode-jump to the mode i+3 set as the optimal point from the mode i+6, as illustrated with the reference sign g83. In this case, the mode changes as illustrated during the period of the timings t15 and t17 in FIG. 8, and the position of the mirror 207 is adjusted to the optimal point of the minimum level of the reflected light L3, in other words, the position corresponding to the mode i+3.

Note that, when the mode of a lower level of the reflected light L3 than the optimal point is detected after setting the optimal point, the control section 10 may search for an optimal point again.

In the above, with reference to FIGS. 7 and 8, an example of the operation of the identification of the mode of the minimum level of the reflected light L3 has been described.

4.3. Process Flow

Figure 9:
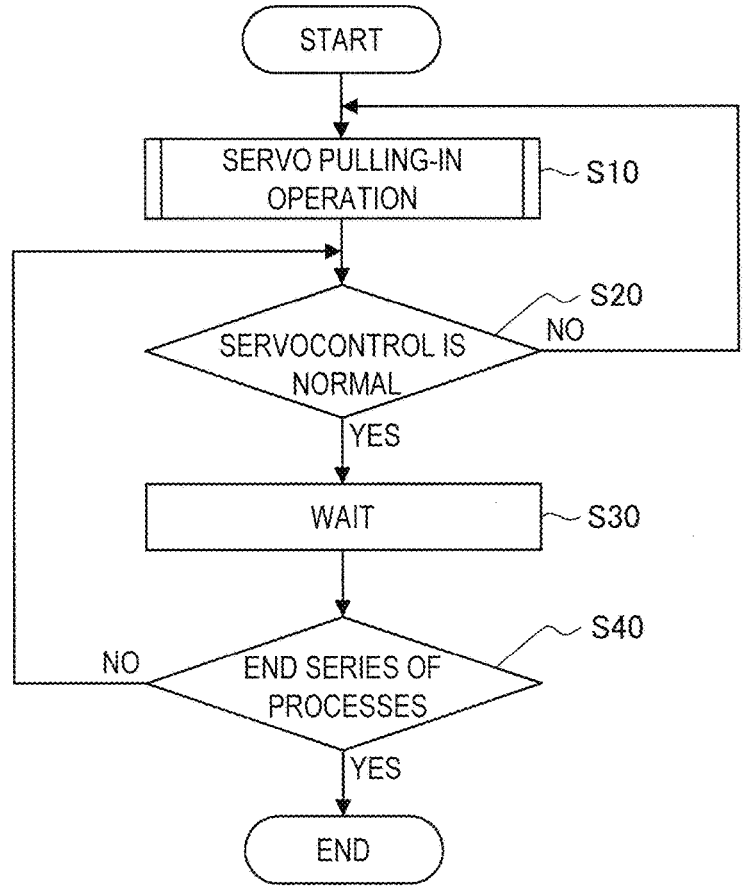
FIG. 9 is a flowchart illustrating a flow of a series of operations of a control section according to the same embodiment.

Next, a series of operations of the control of the light path length of the excitation laser L1 in the resonator 20 by the control section 10 according to the present embodiment will be described with reference to FIGS. 9 and 10. First, FIG. 9 is referred to. FIG. 9 is a flowchart illustrating the flow of a series of operations of the control section 10 according to the present embodiment.

(Step S10)

When the laser light generation device 1 starts its operation, the control section 10 sequentially switches the mode, and acquires the detection result of the level of the reflected light L3 for each switched mode, and identifies the mode of the minimum level of the reflected light L3. Then, the control section 10 performs the pulling-in of the servo so as to resonate in the mode identified by the excitation laser light L1. Note that the detail of the operation of the pulling-in of the servo will be described later in a separate manner.

(Step S20)

When the pulling-in of the servo is completed, the control section 10 acquires the detection result of the reflected light L3 from the resonator 20 from the photodetector 41, and determines whether or not the servocontrol normally operates on the basis of the level of the reflected light L3.

Specifically, when the servocontrol normally operates, in other words, when the light path length of the excitation laser L1 in the resonator 20 satisfies the resonance condition of the excitation laser L1, the level of the reflected light L3 becomes low as illustrated in FIG. 2, for example. On the other hand, when the light path length of the excitation laser L1 in the resonator 20 does not satisfy the resonance condition of the excitation laser L1, the level of the reflected light L3 becomes higher as compared with a case which satisfies the resonance condition. By utilizing these characteristics, the control section 10 can determine whether or not the servocontrol normally operates.

If the servocontrol does not operate normally (step S20, NO), the control section 10 executes the pulling-in operation of the servo again.

(Steps S30, S40)

If the servocontrol normally operates (step S20, YES), the control section 10 stops the process temporarily for a predetermined period (step S30), and confirms whether or not the servocontrol normally operates again after the period elapses. The control section 10 continues the above operation, until the operation of the laser light generation device 1 stops, for example (step S40, NO). Then, if the stop of the operation of the laser light generation device 1 is instructed (step S40, YES), the control section 10 ends the series of processes of the control of the light path length of the excitation laser L1 in the resonator 20.

Next, with reference to FIG. 10, an example of the operation of the pulling-in of the servo, which is illustrated as step S10 in FIG. 9, will be described in detail. FIG. 10 is a flowchart illustrating the flow of a series of operations of the pulling-in of the servo by the control section 10 according to the present embodiment.

(Step S101)

First, the control section 10 performs the initial pulling-in of the servo, by comparing the level of the reflected light L3 from the resonator 20 detected by the photodetector 41 with the threshold value g25. Thereby, the position of the mirror 207 is adjusted to the position of the mode i in the example illustrated in FIG. 7, for example. Note that, in the following, the mode immediately after completing the initial pulling-in operation will be described as the mode 0 (i=0).

(Step S102)

When the initial pulling-in of the servo is completed, the control section 10 controls the position of the mirror 207 so as to mode-jump in a predetermined direction. For example, in the example illustrated in FIG. 10, the control section 10 controls the position of the mirror 207 so as to mode-jump in + (plus) direction (i=i+1).

(Step S103)

After controlling the position of the mirror 207 to jump between the modes, the control section 10 acquires the detection result of the reflected light L3 after the mode jump from the photodetector 41, and compares the levels of the reflected light L3 between before and after the mode jump.

(Step S111)

If the change of the level of the reflected light L3 is + (plus), in other words, if the level of the reflected light L3 after the mode jump is higher than before the mode jump (step S103, YES), the control section 10 controls the position of the mirror 207 so as to mode-jump in − (minus) direction. After controlling the position of the mirror 207, the control section 10 acquires the detection result of the reflected light L3 after the mode jump from the photodetector 41, and compares the levels of the reflected light L3 between before and after the mode jump.

(Step S112)

As described above, the control section 10 controls the position of the mirror 207 so as to mode-jump in − (minus) direction, as long as the change of the level of the reflected light L3 is − (minus) between before and after the mode jump (step S112, NO).

(Step S113)

If the change of the level of the reflected light L3 is + (plus) between before and after the mode jump (step S112, YES), the control section 10 recognizes the mode at that time as the mode that has passed the optimal point, and sets the immediately previous mode (Imax=i) as the optimal point. In this case, the control section 10 stores the level of the reflected light L3 in the mode set as the optimal point.

(Step S114)

After setting the optimal point, the control section 10 controls the position of the mirror 207 so as to mode-jump in − (minus) direction by a predetermined number n of modes with respect to the optimal point (step S115, NO).

(Step S116)

After controlling the position of the mirror 207 so as to mode-jump in − (minus) direction by the number of modes n with respect to the optimal point, the control section 10 acquires the detection result of the reflected light L3 after the mode jump from the photodetector 41. Then, the control section 10 compares the levels of the reflected light L3 between the mode (Imax=i) set as the optimal point and the mode after the mode jump.

If the change of the level of the reflected light L3 is not + (plus) between before and after the mode jump (step S116, NO), it is meant that the level of the reflected light L3 is not the minimum in the mode corresponding to Imax=i. Hence, the control section 10 identifies the mode of the minimum value level of the reflected light L3, by executing again the process at and after step S102.

(Step S117)

If the change of the level of the reflected light L3 is + (plus) between before and after the mode jump (step S116, YES), it is meant that the level of the reflected light L3 is the minimum in the mode corresponding to Imax=i. In this case, the control section 10 controls the position of the mirror 207 so as to mode-jump in + (plus) direction by the number n of modes, and ends a series of operations of the pulling-in of the servo. Thereby, the position of the mirror 207 is adjusted to the position of the mode corresponding to Imax=i.

(Step S121)

Note that the basic operation executed if the change of the level of the reflected light L3 is − (minus) between before and after the mode jump (step S103, NO) in step S103 is similar to the operation illustrated in aforementioned steps S111 to S117, except that the control direction of the mirror 207 is different.

That is, the control section 10 controls the position of the mirror 207 so as to mode-jump in + (plus) direction. After controlling the position of the mirror 207, the control section 10 acquires the detection result of the reflected light L3 after the mode jump from the photodetector 41, and compares the levels of the reflected light L3 between before and after the mode jump.

(Step S122)

As described above, the control section 10 controls the position of the mirror 207 so as to mode-jump in + (plus) direction, as long as the change of the level of the reflected light L3 is − (minus) between before and after the mode jump (step S122, NO).

(Step S123)

If the change of the level of the reflected light L3 is + (plus) between before and after the mode jump (step S122, YES), the control section 10 recognizes the mode at that time as the mode that has passed the optimal point, and sets the immediately previous mode (Imax=i) as the optimal point. In this case, the control section 10 stores the level of the reflected light L3 in the mode set as the optimal point.

(Step S124)

After setting the optimal point, the control section 10 controls the position of the mirror 207 so as to mode-jump in + (plus) direction by a predetermined number n of modes with respect to the optimal point (step S125, NO).

(Step S126)

After controlling the position of the mirror 207 so as to mode-jump in + (plus) direction by the number n of modes with respect to the optimal point, the control section 10 acquires the detection result of the reflected light L3 after the mode jump from the photodetector 41. Then, the control section 10 compares the levels of the reflected light L3 between the mode (Imax=i) set as the optimal point and the mode after the mode jump.

If the change of the level of the reflected light L3 is not + (plus) between before and after the mode jump (step S126, NO), it is meant that the level of the reflected light L3 is not the minimum in the mode corresponding to Imax=i. Hence, the control section 10 identifies the mode of the minimum value level of the reflected light L3, by executing again the process at and after step S102.

(Step S127)

If the change of the level of the reflected light L3 is + (plus) between before and after the mode jump (step S126, YES), it is meant that the level of the reflected light L3 is the minimum in the mode corresponding to Imax=i. Hence, the control section 10 controls the position of the mirror 207 so as to mode-jump in − (minus) direction by the number n of modes, and ends a series of operations of the pulling-in of the servo. Thereby, the position of the mirror 207 is adjusted to the position of the mode corresponding to Imax=i.

Figure 10:
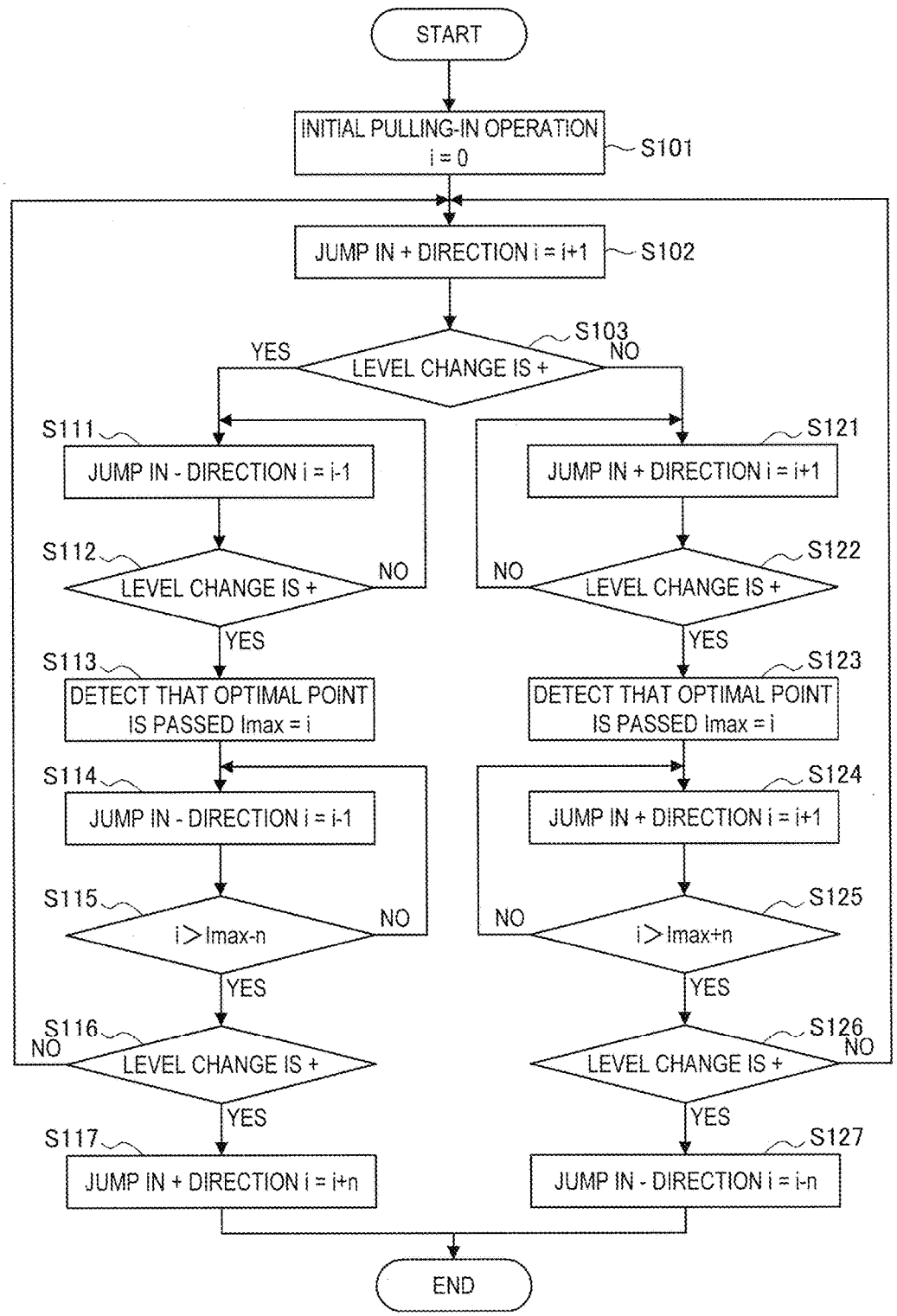
FIG. 10 is a flowchart illustrating a flow of a series of operations of pulling-in of servo.

In the above, with reference to FIGS. 9 and 10, the series of operations of the control of the light path length of the excitation laser L1 in the resonator 20 by the control section 10 according to the present embodiment has been described. Note that the operation described above is just an example, and it is needless to say that the operation is not necessarily limited to the example described above.

As a specific example, the control section 10 may be configured to always monitor whether or not the servocontrol normally operates, while starting up the laser light generation device 1.

Although, in the example illustrated in FIG. 10, the control section 10 performs the control of the mirror 207 position by the mode jump after the initial pulling-in, the control section 10 may perform the control of the mirror 207 position by the mode jump without performing the initial pulling-in. In this case, for example, the control section 10 first narrows down the range of the mode of the minimum level of the reflected light L3, by controlling the mirror 207 position so as to mode-jump by a plurality of modes. Then, the control section 10 may identify the mode of the minimum level of the reflected light L3, by controlling the mirror 207 position so as to mode-jump by a smaller number of modes within the narrowed range.

4.4. Considerations

In the above, the detail of the control section 10 according to the present embodiment has been described. As above describe, the control section 10 controls the position of the mirror 207 in such a manner that the mode switches (i.e., mode-jumps) sequentially, and acquires the level of the reflected light L3 with respect to the each switched mode. Then, the control section 10 compares the levels of the reflected light L3 between before and after the mode jump, and identifies the mode of the lowest level of the reflected light L3. With this configuration, the control section 10 according to the present embodiment can control the light path length in the resonator 20, so as to resonate in the mode capable of outputting the OPO laser light L2 of a higher strength.

Also, the control section 10 according to the present embodiment once stops the servocontrol based on the difference signal, when performing the mode jump, and restarts the servocontrol after completing the mode jump. With this configuration, the control section 10 according to the present embodiment can perform the mode jump smoothly.

5. Exemplary Variant

5.1. Configuration of Laser Light Generation Device

Figure 11:
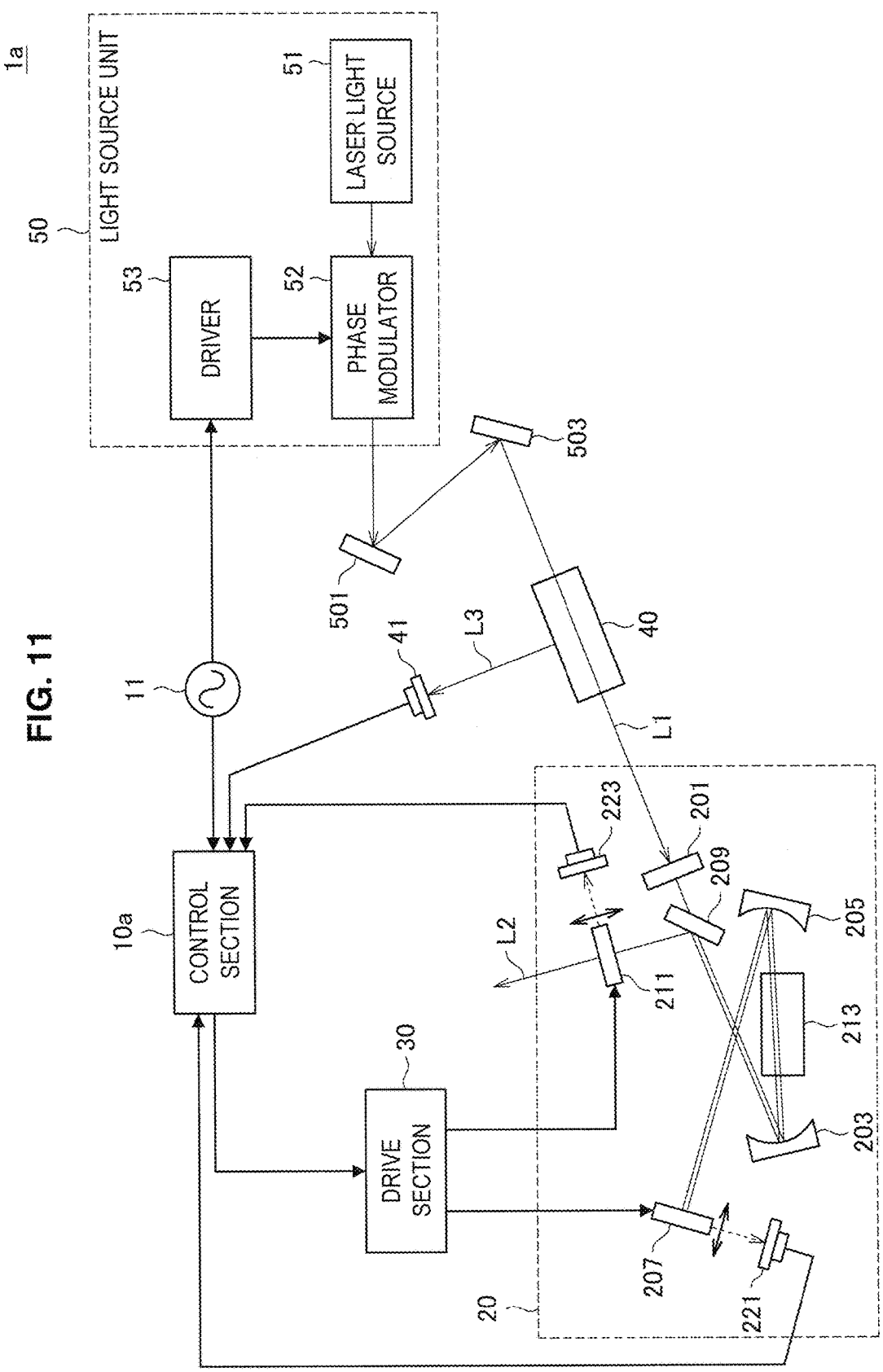
FIG. 11 is a configuration diagram illustrating an example of a schematic configuration of a laser light generation device according to the exemplary variant.

Next, an exemplary variant of the laser light generation device 1 according to the aforementioned embodiment will be described. First, the configuration of the laser light generation device 1a according to the exemplary variant will be described with reference to FIG. 11. FIG. 11 is a diagram illustrating the configuration of the laser light generation device 1a according to the exemplary variant.

As illustrated in FIG. 11, the laser light generation device 1a according to the exemplary variant is different from the laser light generation device 1 (refer to FIG. 1) according to the aforementioned embodiment, in that the position detecting units 221 and 223 are included. Hence, in the following, the position detecting units 221 and 223 and the control section 10a, which are different from the aforementioned laser light generation device 1, will be described, and the detailed description will be omitted with respect to other elements.

For example, the position detecting units 221 and 223 include a light position sensor (PSD: Position Sensitive Detector).

The position detecting unit 221 detects the position of the mirror 207 that moves along the optical axis direction of the excitation laser L1 and OPO the laser L2 in the resonator 20. The position detecting unit 221 reports information indicating the position of the detected mirror 207 to the control section 10a. Thereby, the control section 10a can recognize the position of the mirror 207 in the resonator 20.

In a similar way, the position detecting unit 223 detects the position of the output coupler 211 that moves along the optical axis direction of OPO the laser L2 in the resonator 20. The position detecting unit 223 reports information indicating the position of the detected output coupler 211 to the control section 10a. Thereby, the control section 10a can recognize the position of the output coupler 211 in the resonator 20.

The control section 10a changes the light path length of the excitation laser light L1 in the resonator 20 in such a manner that the set mode sequentially switches to another mode different from the set mode, in a similar way as the control section 10 according to the aforementioned embodiment, and identifies the optimal point (i.e., the mode of the minimum level of the reflected light L3). Then, the control section 10a adjusts the position of the mirror 207 to the position corresponding to the identified optimal point.

After adjusting the position of the mirror 207 to the position corresponding to the optimal point, the control section 10a according to the exemplary variant acquires the detection result of the position of the mirror 207 at that time from the position detecting unit 221, and stores the position information indicating the detection result.

Figure 12:
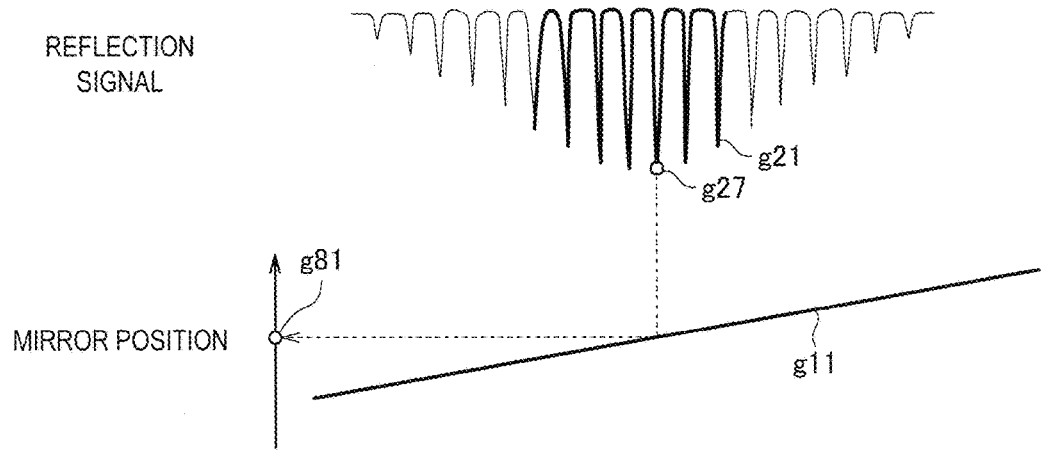
FIG. 12 is an explanatory diagram for describing an overview of an operation of a control section according to the exemplary variant.

Here, FIG. 12 is referred to. FIG. 12 is an explanatory diagram for describing an overview of the operation of the control section 10a according to the exemplary variant. In FIG. 12, the reference sign g11 indicates the position of the mirror 207, and the reference sign g21 indicates the reflection signal (i.e., the signal indicating the level of the reflected light L3) obtained corresponding to each position of the mirror 207 illustrated with the reference sign g11. Also, the reference sign g27 indicates the mode of the minimum level of the reflected light L3, in other words, the optimal point.

As illustrated in FIG. 12, the control section 10a can recognize the position of the mirror 207 corresponding to the optimal point g27 on the basis of the position information g81 that the detection result of the position detecting unit 221 indicates. Hence, the control section 10a can adjust the position of the mirror 207 to the position corresponding to the optimal point, on the basis of the position information g81 stored in advance, when the position of the mirror 207 changes due to disturbance such as impact on the resonator 20, for example.

Similar can be applied to the output coupler 211. That is, the control section 10a can control the position of the output coupler 211 so as to satisfy the resonance condition of the OPO laser light L2, on the basis of the position information stored in advance, even when the position of the output coupler 211 changes due to the disturbance.

In the above, with reference to FIGS. 11 and 12, the configuration of the laser light generation device 1a according to the exemplary variant has been described. Note that, in the example illustrated above, an example in which the light position sensor is used as the position detecting units 221 and 223 has been described. However, it is needless to say that, if the control section 10a can recognize the position of the mirror 207 and the output coupler 211 in the resonator 20, the method is not limited to the method that recognizes on the basis of the output of the light position sensor such as the position detecting units 221 and 223.

5.2. Process Flow

Figure 13:
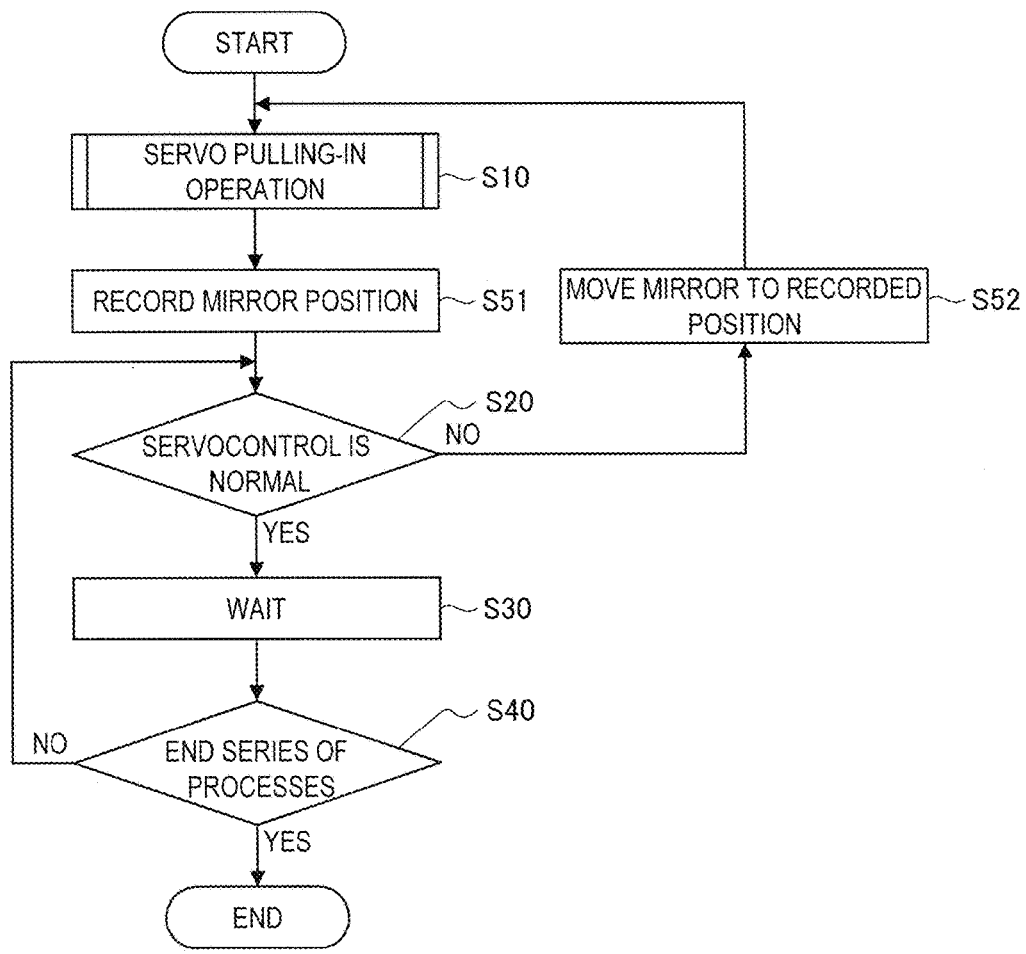
FIG. 13 is a flowchart illustrating a flow of a series of operations of a control section according to the exemplary variant.

Next, with reference to FIG. 13, a series of operations of the control of the light path length of the excitation laser L1 in the resonator 20 by the control section 10a according to the exemplary variant will be described. FIG. 13 is a flowchart illustrating a flow of a series of operations of the control section 10a according to the exemplary variant.
(Step S10)

When the laser light generation device 1 starts the operation, the control section 10a sequentially switches the mode, and acquires the detection result of the level of the reflected light L3 with respect to each switched mode, and identifies the mode of the minimum level of the reflected light L3 (i.e., the optimal point). Then, the control section 10a performs the pulling-in of the servo, in such a manner that the excitation laser light L1 resonates in the identified mode. Note that the operation of the pulling-in of the servo is similar to the case of the control section 10 according to the aforementioned embodiment (FIGS. 9 and 10).
(Step S51)

When the pulling-in of the servo is completed, the control section 10a acquires the position information indicating the position of the mirror 207 from the position detecting unit 221. With the position information, the control section 10a can recognize the position of the mirror 207 corresponding to the mode of the minimum level of the reflected light L3 (i.e., the optimal point). The control section 10a records the position information of the mirror 207 corresponding to the optimal point, which is acquired from the position detecting unit 221. Also, in this case, the control section 10a may acquire the position information of the output coupler 211 from the position detecting unit 223 and store the position information.
(Step S20)

Thereafter, the control section 10 acquires the detection result of the reflected light L3 from the resonator 20 from the photodetector 41, and determines whether or not the servocontrol normally operates on the basis of the level of the reflected light L3.
(Steps S52, S10)

If the servocontrol does not operate normally (step S20, NO), the control section 10 controls the position of the mirror 207 to the position corresponding to the optimal point, on the basis of the position information of the mirror 207 corresponding to the optimal point recorded in advance (step S52). Also, in this case, the control section 10a may control the position of the output coupler 211 on the basis of the position information of the output coupler 211 recorded in advance. After controlling the position of the mirror 207 on the basis of the position information recorded in advance, the control section 10 executes the pulling-in operation of the servo again (step S10).
(Steps S30, S40)

Note that, if the servocontrol normally operates (step S20, YES), the control section 10a stops the process temporarily for a predetermined period (step S30), and confirms whether or not the servocontrol normally operates again after the period elapses. The control section 10a continues the above operation until the operation of the laser light generation device 1 stops, for example (step S40, NO). Then, if the stop of the operation of the laser light generation device 1 is instructed (step S40, YES), the control section 10a ends the series of processes of the control of the light path length of the excitation laser L1 in the resonator 20.

In the above, with reference to FIG. 13, the flow of the series of operations of the control section 10a according to the exemplary variant has been described.

5.3. Considerations

As described above, the control section 10a according to the exemplary variant can recognize the position of the mirror 207 corresponding to the optimal point g27, on the basis of the position information indicated by the detection result of the position detecting unit 221. Hence, the control section 10a can adjust the position of the mirror 207 to the position corresponding to the optimal point, on the basis of the position information stored in advance, even when the position of the mirror 207 changes due to the disturbance such as the impact on the resonator 20, for example.

Similar can be applied to the output coupler 211. That is, the control section 10a can control the position of the output coupler 211 so as to satisfy the resonance condition of the OPO laser light L2, on the basis of the position information stored in advance, even when the position of the output coupler 211 changes due to the disturbance.

Also, the control section 10a according to the exemplary variant may identify the mode of the minimum level of the reflected light L3 again, on the basis of the operation of the mode jump, after adjusting the position of the mirror 207 on the basis of the position information stored in advance. In this case as well, the control of the position of the mirror 207 based on the position information allows the mirror 207 to move to the vicinity of the position corresponding to the optimal point, and thus the control section 10a can immediately identify the mode of the minimum level of the reflected light L3 again.

6. Hardware Configuration

Figure 14:
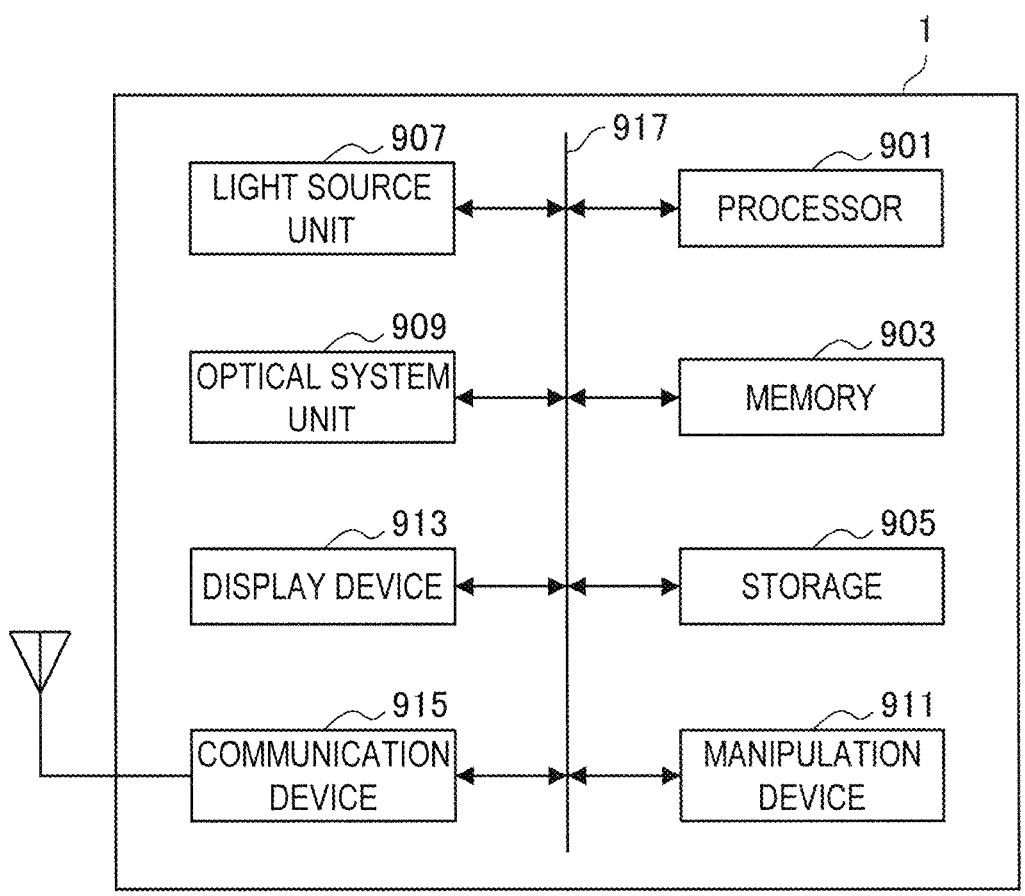
FIG. 14 is a diagram illustrating one example of a hardware configuration of a laser light generation device according to an embodiment of the present disclosure.

Next, description will be made of one example of a hardware configuration of the laser light generation device 1 according to the present embodiment, with reference to FIG. 14. FIG. 14 is a diagram illustrating one example of the hardware configuration of the laser light generation device 1 according to the present embodiment.

As illustrated in FIG. 14, the laser light generation device 1 according to the present embodiment includes a processor 901, a memory 903, a storage 905, a light source unit 907, an optical system unit 909, a manipulation device 911, a display device 913, a communication device 915, and a bus 917.

The processor 901 may be, for example, a central processing unit (CPU), a graphics processing unit (GPU), a digital signal processor (DSP) or a system on chip (SoC), and executes various processings of the laser light generation device 1. The processor 901 may be configured by an electronic circuit for executing various types of arithmetic processings, for example. Note that the aforementioned control section 10 may be configured by the processor 901.

The memory 903 includes a random access memory (RAM) and a read only memory (ROM), and stores programs and data executed by the processor 901. The storage 905 may include a memory medium such as a semiconductor memory and a hard disk. Note that the aforementioned storage unit 66 can be configured with the memory 903 and the storage 905, for example.

The light source unit 907 is a unit for radiating the excitation laser light L1, and corresponds to the aforementioned light source unit 50. The light source unit 907 is controlled with respect to the strength and the wavelength of the emitted excitation light, by the processor 901.

The optical system unit 909 is the unit which resonates the excitation laser light L1 emitted from the light source unit 907, converts the wavelength of the excitation laser light L1, and outputs the OPO laser light L2 into which the wavelength has been converted. The optical system unit 909 corresponds to the resonator 20 and the optical system for causing the resonator 20 to direct the excitation laser light L1 (for example, the mirrors 501 and 503).

The manipulation device 911 has the function to generate the input signal for the user to perform a desired manipulation. The manipulation device 911 may be configured by an input section, such as for example a button, a switch, and the like, for the user to input information, an input control circuit for generating the input signal on the basis of the input by the user and supplying the input signal to the processor 901, and the like.

The display device 913 is one example of the output device, and may be a display device such as a liquid crystal display (LCD) device, and an organic light emitting diode (OLED) display device. The display device 913 can provide information by displaying frames to the user.

The communication device 915 is communication means which is included in the laser light generation device 1, and communicates with external devices via a network. The communication device 915 is an interface for wireless communication, and may include a communication antenna, a radio frequency (RF) circuit, a baseband processor, and others.

The communication device 915 has the function to execute various types of signal processings to the signal received from the external device, and is capable of supplying the digital signal generated from the received analog signal to the processor 901.

The bus 917 connects the processor 901, the memory 903, the storage 905, the light source unit 907, the optical system unit 909, the manipulation device 911, the display device 913, and the communication device 915 with each other. The bus 917 may include a plurality of types of buses.

Also, a program for causing the hardware such as the CPU, the ROM and the RAM built in a computer to perform the function equivalent to the configuration of the image acquisition device 1 described above is also producible. Also, a computer-readable memory medium recording the program can also be provided.

7. Conclusion

Embodiments of the present disclosure have been described above in detail with reference to the accompanying drawings, whilst the technical scope of the present disclosure is not limited to such an example. A person having ordinary knowledge in the technical field of the present disclosure obviously can conceive of various alterations and modifications within the scope of the technical concept recited in the appended claims, and it should be understood that they will naturally come under the technical scope of the present disclosure.

Additionally, the present technology may also be configured as below.

(1)

A control device including:

a drive section that moves, in an optical axis direction, at least one of a pair of reflecting units in a resonator that includes the at least a pair of reflecting units and a non-linear optical crystal, converts a wavelength of an entering laser light by resonating the laser light and has a plurality of modes that satisfy a resonance condition of the entering laser light; and a control section that controls a light path length of the resonator, by causing the drive section to move the at least one of reflecting units so that the laser light that enters into the resonator changes from a state in which the laser light resonates in a first mode of the plurality of modes to a state in which the laser light resonates in a second mode different from the first mode, on the basis of a detection result of a reflected light from the resonator.

(2)

The control device according to (1), wherein the control section controls the light path length of the resonator so as to change to a resonating state in at least one of the plurality of modes, according to a level of the detected reflected light.

(3)

The control device according to (1) or (2), wherein the control section controls the light path length of the resonator so as to change from the resonating state in the first mode to the resonating state in the second mode, by supplying, to the drive section, a jump pulse including a kick pulse for moving the at least one of reflecting units by a predetermined distance and a brake pulse for stopping the reflecting unit that has moved on the basis of the kick pulse.

(4)

The control device according to any one of (1) to (3), wherein the control section stores position information indicating a position of the reflecting unit, when controlling the light path length of the resonator to change the light path length of the resonator to a resonating state in one of the plurality of modes, on the basis of the detection result of the reflected light, and controls the light path length of the resonator on the basis of the stored position information.

(5)

The control device according to any one of (1) to (4), wherein the control section controls the light path length of the resonator in such a manner that the laser light that enters into the resonator resonates in a mode of a minimum level of the reflected light, among the plurality of modes.

(6)

The control device according to (5), wherein the control section controls the light path length of the resonator so that the mode switches sequentially, and acquires a level of the reflected light corresponding to each mode after the switch, and identifies the mode of the minimum level of the reflected light, according to the acquired level of the reflected light corresponding to each mode.

(7)

The control device according to (6), wherein the control section controls the light path length of the resonator so that the mode switches by a first unit at least larger than a distance between adjacent modes, and acquires the level of the reflected light corresponding to each switched mode, and identifies a first mode of a minimum level of the reflected light from among the modes according to the acquired level of the reflected light corresponding to each mode, and then controls the light path length of the resonator so that the mode switches by a second unit smaller than the first unit at a vicinity of the first mode, acquires the level of the reflected light corresponding to the each switched mode, and identifies the mode of the minimum level of the reflected light according to the acquired level of the reflected light corresponding to each mode.

(8)

The control device according to any one of (1) to (6), wherein the second mode is a mode adjacent to the first mode.

(9)

The control device according to any one of (1) to (8), wherein the control section servocontrols the light path length so that the light path length of the resonator satisfies a resonance condition corresponding to a set mode, and stops the servocontrol when changing from the state in which the laser light that enters into the resonator resonates in the first mode to the state in which the laser light resonates in the second mode, and restarts the servocontrol in the second mode as the set mode after the change of state.

(10)

The control device according to (9), wherein the control section generates a difference signal indicating a difference between the light path length of the resonator and a light path length that satisfies a resonance condition of the entering laser light, on the basis of the detection result of the reflected light, and servocontrols the light path length of the resonator on the basis of the generated difference signal.

(11)

A control method including:

moving, by a drive section, in an optical axis direction, at least one of a pair of reflecting units in a resonator that includes the at least a pair of reflecting units and a non-linear optical crystal, converts a wavelength of an entering laser light by resonating the laser light and has a plurality of modes that satisfy a resonance condition of the entering laser light; and controlling, by a processor, a light path length of the resonator, by causing the drive section to move the at least one of reflecting units so that the laser light that enters into the resonator changes from a state in which the laser light resonates in a first mode of the plurality of modes to a state in which the laser light resonates in a second mode different from the first mode, on the basis of a detection result of a reflected light from the resonator.

(12)

A program for causing a computer to execute:

a step of moving, in an optical axis direction, at least one of a pair of reflecting units in a resonator that includes the at least a pair of reflecting units and a non-linear optical crystal, converts a wavelength of an entering laser light by resonating the laser light and has a plurality of modes that satisfy a resonance condition of the entering laser light; and a step of controlling a light path length of the resonator, by moving the at least one of reflecting units so that the laser light that enters into the resonator changes from a state in which the laser light resonates in a first mode of the plurality of modes to a state in which the laser light resonates in a second mode different from the first mode, on the basis of a detection result of a reflected light from the resonator.

REFERENCE SYMBOLS LIST 1, 1a laser light generation device
10, 10a control section
101 difference signal generation section
103 level detection section
105 level detection section
107 servocontrol section
109 switch
111 phase compensation section
113 VCM driver
121 servocontrol section
123 jump pulse generation section
125 switch
125a terminal
125b terminal
125c terminal
11 oscillator
20 resonator
201 input coupler
203, 205, 207 mirror
209 dichroic mirror
211 output coupler
213 non-linear optical element
221, 223 position detecting unit
30 drive section
40 isolator
41 photodetector
50 light source unit
51 laser light source
52 phase modulator
53 driver

The invention claimed is:

1. A control device comprising:
a drive section configured to move, in an optical axis direction, at least one of a plurality of reflecting units in a resonator to change a light path length of the resonator, wherein the resonator converts a wavelength of laser light that enters the resonator by resonating the laser light in one or more of a plurality of modes that satisfy a resonance condition of the laser light; and
a control section configured to control the light path length of the resonator based on a detection of reflected light from the resonator, the controlling comprising:
causing the drive section to move the at least one reflecting unit to cause the laser light that enters into the resonator to change from a first state in which the laser light resonates in a first mode of the plurality of modes to a second state in which the laser light resonates in a second mode of the plurality of modes different from the first mode.

2. The control device according to claim 1, wherein the control section is further configured to control the light path length of the resonator based on a level of the detected reflected light.

3. The control device according to claim 1, wherein causing the drive section to move comprises supplying, to the drive section, a jump pulse for moving the at least one reflecting unit and a brake pulse for stopping the reflecting unit that has moved in response to the jump pulse.

4. The control device according to claim 1, wherein the control section is further configured to:
store position information indicating a position of the at least one reflecting unit, and
control the light path length of the resonator based on the stored position information.

5. The control device according to claim 1, wherein the control section is further configured to control the light path length of the resonator to cause the laser light to resonate in a mode corresponding to a minimum level of the reflected light.

6. The control device according to claim 5, wherein the control section is configured to:
control the light path length of the resonator to cause the laser light to resonate in multiple ones of the plurality of modes,
determine a level of the reflected light corresponding to each of the multiple modes, and
identify, based on levels of the reflected light corresponding to the multiple modes, the mode corresponding to the minimum level of the reflected light.

7. The control device according to claim 6, wherein the control section is configured to:
control the light path length to change the mode in which the laser light is resonating by a first unit at least larger than a distance between adjacent modes of the plurality of modes to obtain a first set of levels of the reflected light,
identify a first mode corresponding to a minimum of the first set of levels of the reflected light,
control the light path length to change the mode in which the laser light is resonating by a second unit smaller than the first unit in a vicinity of the first mode corresponding to the minimum of the first set of levels of the reflected light to obtain a second set of levels of the reflected light, and
identify the mode corresponding to the minimum level of the reflected light based on the second set of levels of the reflected light.

8. The control device according to claim 1, wherein the second mode comprises a mode adjacent to the first mode.

9. The control device according to claim 1, wherein the control section is configured to:
servocontrol the light path length so that the light path length of the resonator satisfies a resonance condition corresponding to the second mode, the controlling comprising:
stopping changing of the light path length when the laser light has changed from the first state in which the laser light resonates in the first mode to the second state in which the laser light resonates in the second mode; and
restarting changing of the light path length when the mode in which the laser light is resonating changes from the second mode.

10. The control device according to claim 1, wherein the control section is configured to:
generate, based on the detection of the reflected light, a difference signal indicating a difference between the light path length of the resonator and a light path length that satisfies a target resonance condition of the laser light, and
control the light path length of the resonator based on the generated difference signal.

11. A control method comprising:
moving, by a drive section, in an optical axis direction, at least one of a plurality of reflecting units in a resonator to change a light path length of the resonator, wherein the resonator converts a wavelength of laser light that enters the resonator by resonating the laser light in one or more of a plurality of modes that satisfy a resonance condition of the laser light; and
controlling, by a processor, the light path length of the resonator based on a detection of reflected light from the resonator, the controlling comprising:
causing the drive section to move the at least one reflecting unit to cause the laser light that enters into the resonator to change from a first state in which the laser light resonates in a first mode of the plurality of modes to a second state in which the laser light resonates in a second mode of the plurality of modes different from the first mode.

12. At least one non-transitory computer-readable medium storing instructions, which when executed by at least one computer, cause the at least one computer to perform a method comprising:
moving, in an optical axis direction, at least one of a plurality of reflecting units in a resonator to change a light path length of the resonator, wherein the resonator converts a wavelength of laser light that enters the resonator by resonating the laser light in one or more of a plurality of modes that satisfy a resonance condition of the laser light; and
controlling the light path length of the resonator based on a detection of reflected light from the resonator, the controlling comprising:
moving the at least one reflecting unit to cause the laser light that enters into the resonator to change from a first state in which the laser light resonates in a first mode of the plurality of modes to a second state in which the laser light resonates in a second mode of the plurality of modes different from the first mode.

* * * * *